(12) United States Patent
Yamasaki

(10) Patent No.: US 7,676,147 B2
(45) Date of Patent: Mar. 9, 2010

(54) FOCUS DETECTION APPARATUS AND OPTICAL APPARATUS

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 11/742,936

(22) Filed: May 1, 2007

(65) Prior Publication Data

US 2007/0258710 A1 Nov. 8, 2007

(30) Foreign Application Priority Data

May 2, 2006 (JP) ............... 2006-128082

(51) Int. Cl.
*G03B 7/099* (2006.01)
*G03B 3/10* (2006.01)
(52) U.S. Cl. ...................... 396/114; 396/121
(58) Field of Classification Search ............. 396/114, 396/121, 127, 128; 250/201.2, 201.6–201.8
See application file for complete search history.

(56) References Cited

U.S. PATENT DOCUMENTS 5,729,771 A * 3/1998 Ohtaka ................. 396/113

FOREIGN PATENT DOCUMENTS

JP 08-262320 10/1996

* cited by examiner

*Primary Examiner*—W. B. Perkey
*Assistant Examiner*—Minh Q Phan
(74) *Attorney, Agent, or Firm*—Canon U.S.A. Inc., I.P. Division

(57) ABSTRACT

A focus detection apparatus capable of accurate focus detection is disclosed. The apparatus includes a first image-forming lens unit including a first pair of lens portions forming a first pair of images on a first pair of light-receiving element arrays with luminous fluxes from an image-pickup optical system after the luminous fluxes pass through a first pair of apertures making a pair in a first direction, and a second image-forming lens unit including a second pair of lens portions forming a second pair of images on a second pair of light-receiving element arrays with luminous fluxes from the image-pickup optical system after the luminous fluxes pass through a second pair of apertures making a pair in a second direction. A midpoint between the second pair of lens portions is located between the first pair of lens portions and displaced from a midpoint between the first pair of lens portions.

10 Claims, 16 Drawing Sheets

FOCUS DETECTION APPARATUS AND OPTICAL APPARATUS

BACKGROUND OF THE INVENTION

The present invention relates to a focus detection apparatus for use in adjusting the focus of an image-pickup optical system in an image-pickup apparatus such as a digital camera, a video camera, and a film camera, and more particularly, to a focus detection apparatus in a phase difference detection method.

Focus detection methods include a so-called contrast detection method in which a video signal is produced by an image-pickup element and is used for focus detection. The focus detection of the contrast detection method involves a search for an in-focus position corresponding to the peak of the contrast while a focus lens of an image-pickup optical system is gradually moved on an optical axis, so that the method tends to require a long time to achieve an in-focus state.

For this reason, focus detection is often performed with a phase difference detection method in a single-lens reflex digital camera. In the phase difference detection method, since a necessary moving distance of a focus lens for achieving an in-focus state can be determined from the defocus amount of an image-pickup optical system, the time taken to achieve the in-focus state can be significantly reduced as compared with the contrast detection method.

In the focus detection of the phase difference detection method, multipoint focus detection has been proposed in which a focus detection area is provided not only at the center of an image-pickup range but also in an off-axis area on the periphery of the image-pickup range. Japanese Patent Laid-Open No. 8(1996)-262320 is an example of such a focus detection method and has disclosed a focus detection apparatus which performs focus detection in an off-axis area within an image-pickup range.

In the focus detection apparatus disclosed in Japanese Patent Laid-Open No. 8(1996)-262320, phase difference detection in a horizontal direction in the off-axis area is performed with a pair of images formed on a pair of light-receiving element arrays by a pair of lens portions formed on an entrance surface of a secondary image-forming lens and a pair of prism portions formed on an emergence surface thereof. Defocus of an image-pickup lens moves the paired images in the horizontal direction in which a pair of apertures in a stop is arranged. The moving direction of the images is referred to as a correlation direction.

When the lens portion on the entrance side of the secondary image-forming lens and the prism portion on the emergence side thereof are collectively regarded as one optical system, the paired optical systems for detecting a phase difference in the horizontal direction are asymmetric not only in the horizontal direction serving as the correlation direction but also in the vertical direction.

In the paired optical systems asymmetric not only in the correlation direction (horizontal direction) but also in the vertical direction, deformation of the secondary image-forming lens due to a change in ambient environments such as temperature and humidity causes the paired images on the light-receiving element arrays to be moved in both of the horizontal direction and the vertical direction. The moving distance of one of the paired images is different from that of the other since the paired optical systems are asymmetric.

Some proposals have been made on a method of correcting movements of the paired images having different moving distances in the correlation direction resulting from a change in ambient environments by providing sensors which detect temperature and humidity. Even when the correction is performed in the correlation direction, movements of the paired images in the vertical direction orthogonal to the correlation direction may lead to varying focus detection results depending on an object to reduce the accuracy of focus detection.

The focus detection apparatus disclosed in Japanese Patent Laid-Open No. 8(1996)-262320 includes the light-receiving element arrays arranged only in one-dimensional direction in the off-axis area. There is a possibility that focus detection depending on the contrast component of an object cannot be performed.

BRIEF SUMMARY OF THE INVENTION

The present invention provides a focus detection apparatus which enables accurate focus detection without being affected by a change in ambient environments or the contrast component of an object in an off-axis area of an image-pickup range.

According to an aspect, the present invention provides a focus detection apparatus for detecting a phase difference between a pair of images. The apparatus comprises a first image-forming lens unit which includes a first pair of lens portions forming a first pair of images on a first pair of light-receiving element arrays with luminous fluxes from an image-pickup optical system after the luminous fluxes pass through a first pair of apertures making a pair in a first direction, and a second image-forming lens unit which includes a second pair of lens portions forming a second pair of images on a second pair of light-receiving element arrays with luminous fluxes from the image-pickup optical system after the luminous fluxes pass through a second pair of apertures making a pair in a second direction. A midpoint between the second pair of lens portions is located between the first pair of lens portions and displaced from a midpoint between the first pair of lens portions.

According to another aspect, the present invention provides an optical apparatus such as an image-pickup apparatus which includes the abovementioned focus detection apparatus. According to yet another aspect, the present invention provides an image-pickup system which includes an image-pickup apparatus as the optical apparatus and an image-pickup lens (interchangeable lens) removably mounted on the image-pickup apparatus.

Other objects and features of the present invention will be apparent from the following description of preferred embodiments with reference to the accompanying drawings.

DETAILED DESCRIPTION OF THE PREFERRED EMBODIMENTS

Preferred embodiments of the present invention will hereinafter be described with reference to the drawings.

Embodiment 1

Figure 1:
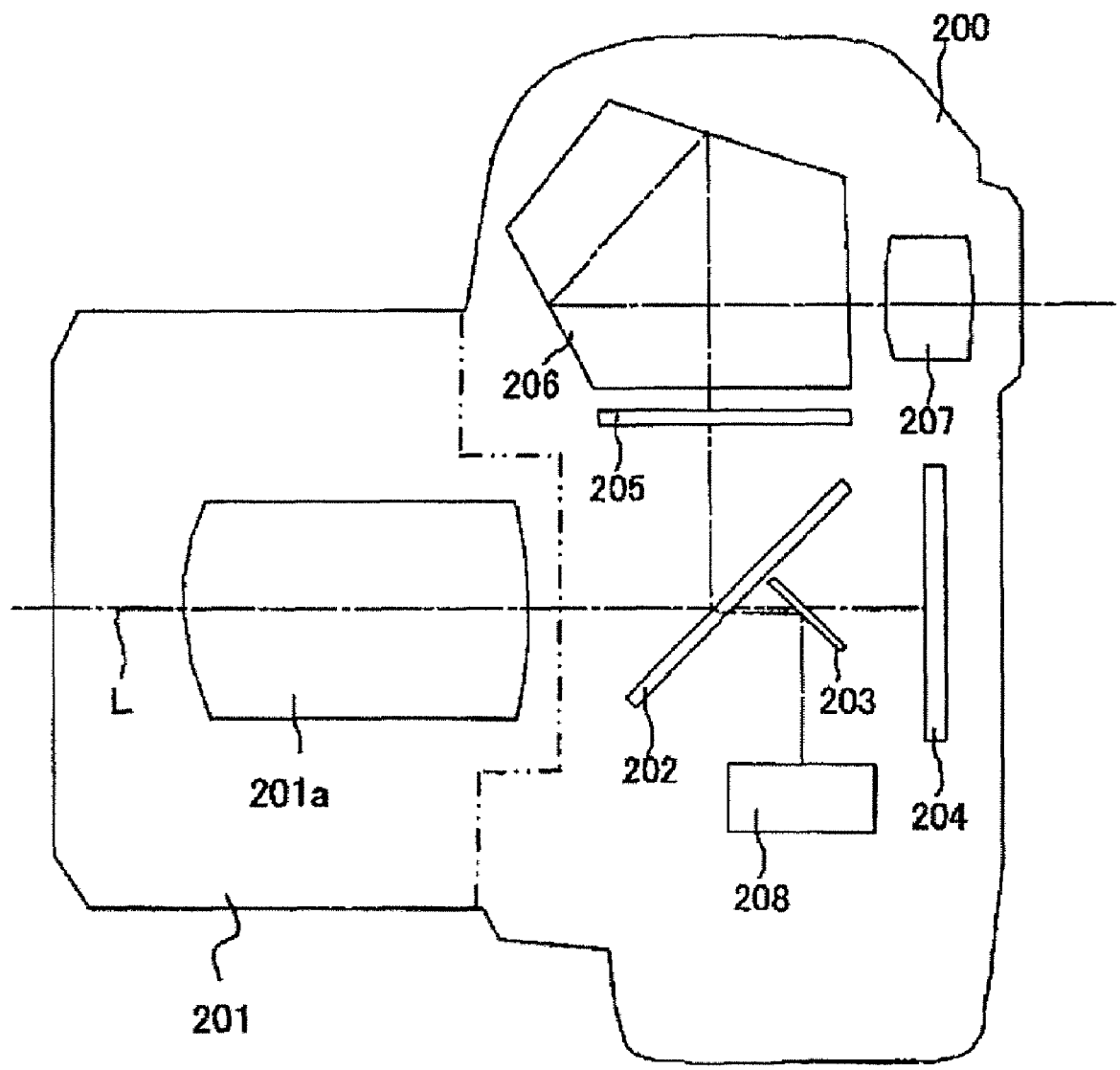
FIG. 1 is a section view showing a single-lens reflex camera containing a focus detection apparatus which is Embodiment 1 of the present invention.

FIG. 1 schematically shows the structure of a single-lens reflex digital camera (an optical apparatus and an image-pickup apparatus) containing a focus detection apparatus which is Embodiment 1 of the present invention.

In FIG. 1, reference numeral 200 shows a body of the single-lens reflex camera, and 201 an image-pickup lens removably mounted on the camera body 200. Reference character L shows the optical axis of an image-forming optical system 201a provided in the image-pickup lens 201 (hereinafter referred to as simply an optical axis of the image-pickup lens 201).

Near a predetermined image-forming plane of the image-pickup lens 201, an image-pickup element unit 204 is placed which includes an optical low-pass filter, an infrared cut filter, and an image-pickup element formed of a CCD sensor or a CMOS sensor.

Between the image-pickup lens 201 and the image-pickup element unit 204, a main mirror 202 and a sub mirror 203 are placed which are disposed on the optical path from the image-pickup lens 201 to the image-pickup element unit 204 during observation through an optical viewfinder and are retracted from a luminous flux on the optical path during image-pickup operation. The main mirror 202 is formed of a half mirror. In observation through the viewfinder, the luminous flux from the image-pickup lens 201 is split into reflected light which is directed toward a viewfinder optical system, later described, and transmitted light which reaches the sub mirror 203. The reflected light forms an image on a matte surface of a focus plate 205, and the image on the matte surface is observed by a user via a pentaprism 206 and an eyepiece 207. The focus plate 205, the pentaprism 206, and the eyepiece 207 constitute the viewfinder optical system.

On the other hand, the light after transmission through the main mirror 202 is reflected by the sub mirror 203 and directed toward a focus detection apparatus 208.

In image-pickup operation, the image-pickup element in the image-pickup element unit 204 photoelectrically converts an object image formed of the luminous flux from the image-pickup lens 201. An image processing circuit, not sown, provided in the camera body 200 performs predetermined processing on output from the image-pickup element to produce an image signal. The image signal is represented as an image on a display, not shown, or recorded as image data on a recording medium (such as a semiconductor memory and an optical disk), not shown.

Figure 2:
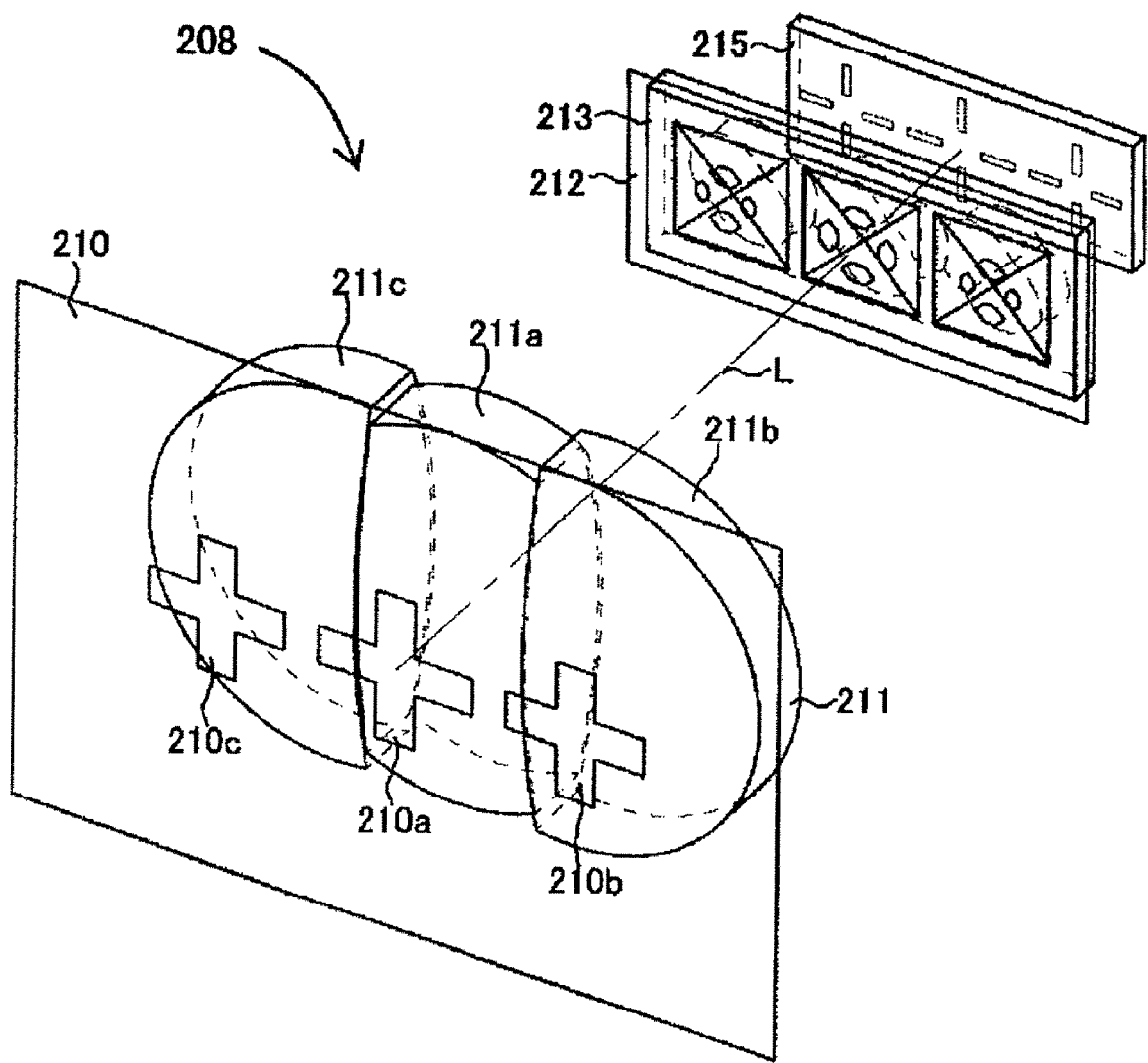
FIG. 2 is a perspective view showing the focus detection apparatus of Embodiment 1.

FIG. 2 shows the structure of the focus detection apparatus 208. The focus detection apparatus 208 of Embodiment 1 detects the focus state of the image-pickup lens 201 with the phase difference detection method. In an actual focus detection apparatus, the optical path is folded by using a mirror or the like to realize a small size, but FIG. 2 shows the optical path developed as a straight line.

Reference numeral 210 shows a field mask which has cross apertures (hereinafter referred to as mask apertures) 210a, 210b, and 210c at the center and on the right and left. The field mask 210 is placed at a position equivalent to or close to the image-pickup surface of the image-pickup element unit 204 serving as the predetermined image-forming plane of the image-pickup lens 201.

Reference numeral 211 shows a field lens which is placed at the back of the field mask 210. The field lens 211 includes a plurality of lens portions 211a, 211b, and 211c which have different optical effects and have different lens optical axes. The lens portions 211a, 211b, and 211c are associated with the mask apertures 210a, 210b, and 210c, respectively. In other words, the lens portions 211a, 211b, and 211c provide the optical effects for the luminous fluxes after they pass through the mask apertures 210a, 210b, and 210c, respectively.

Reference numeral 212 shows a stop having a plurality of apertures. Reference numeral 213 shows a secondary image-forming lens unit (image-forming lens unit) which includes a plurality of pairs of lens portions associated with the plurality of pairs of apertures formed in the stop 212. An object image formed on the predetermined image-forming plane by the image-pickup lens 201 is again formed by the secondary image-forming lens unit 213 on light-receiving element arrays of a light-receiving sensor 215 placed at the back of the unit 213. An infrared cut filter (not shown) is provided immediately in front of the stop 212 to remove infrared wavelength components unnecessary for focus detection.

Figure 3:
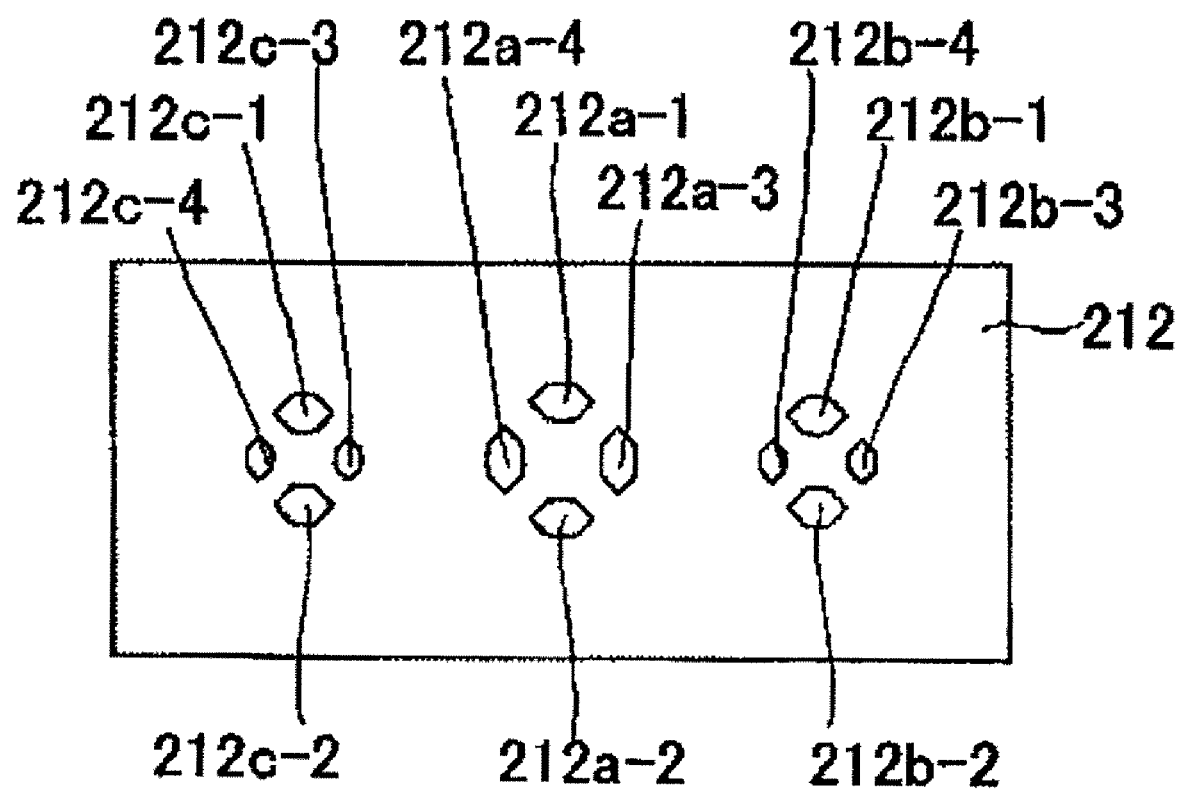
FIG. 3 is a front view showing a stop viewed from a field mask in Embodiment 1.
Figure 4A:
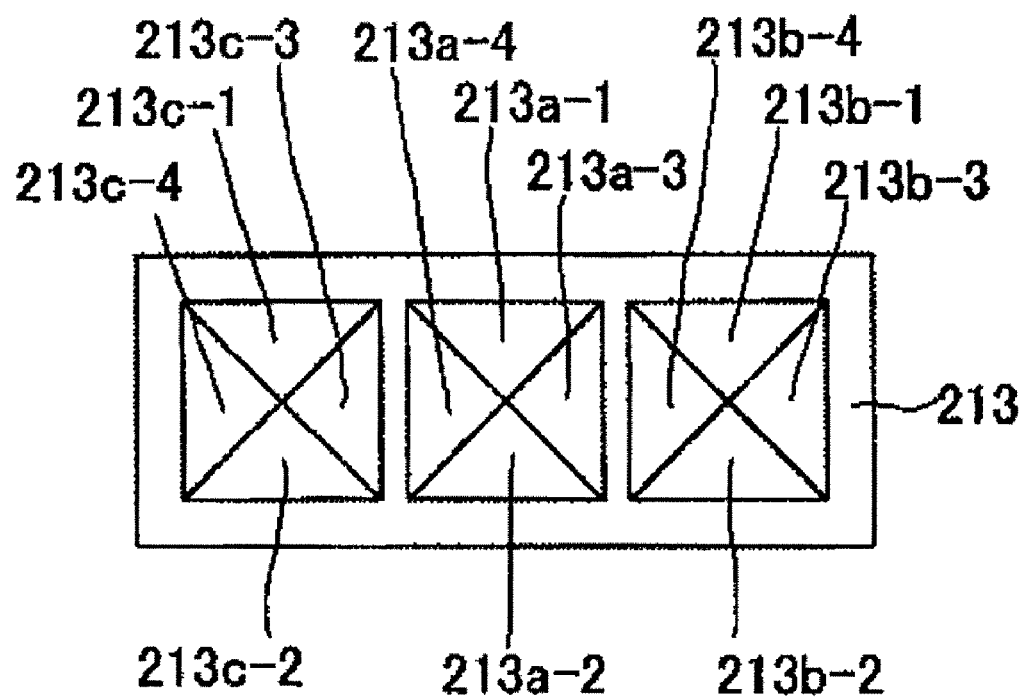
FIG. 4A is a front view showing the entrance surface of a secondary image-forming lens unit in Embodiment 1.
Figure 4B:
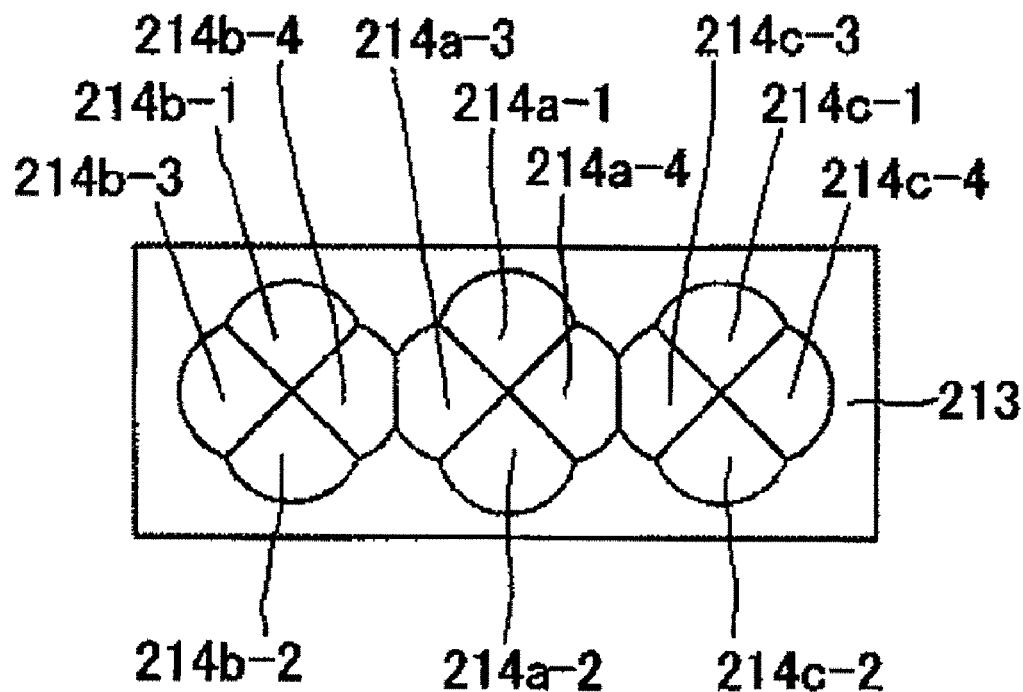
FIG. 4B is a rear view showing the emergence surface of the secondary image-forming lens unit in Embodiment 1.
Figure 5:
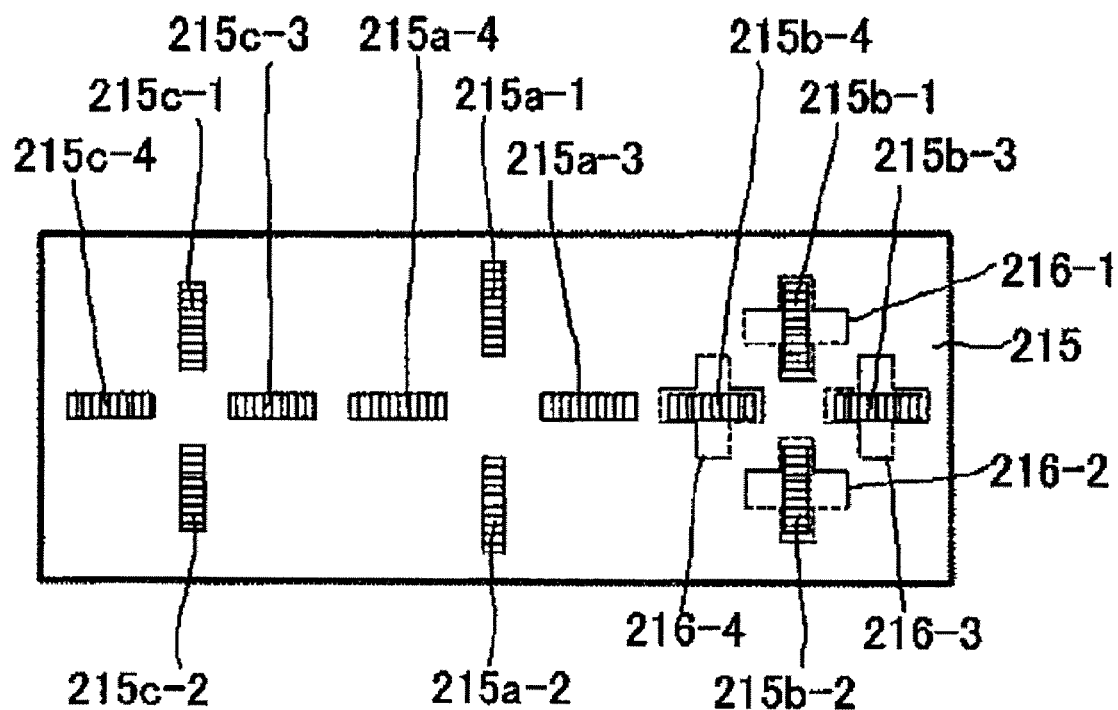
FIG. 5 is a front view showing a light-receiving sensor viewed from the field mask in Embodiment 1.

FIGS. 3 to 5 show the respective members shown in FIG. 2 when viewed from the optical axis direction. FIG. 3 shows the shape of the stop 212 when viewed from the field mask 210. FIG. 4A shows the shape of the secondary image-forming lens unit 213 when viewed from the entrance surface. FIG. 4B shows the shape of the secondary image-forming lens unit 213 when viewed from the emergence surface. FIG. 5 shows the shape of the light-receiving sensor 215 when viewed from the field mask 210.

In FIG. 3, at the center of the stop 212, apertures 212a-1 and 212a-2 are formed which make a pair in a direction (a first direction) corresponding to the vertical direction in the image plane of the image-pickup lens 201 (image-forming optical system 201a), that is, in an image-pickup range (or screen), later described. At the center of the stop 212, apertures 212a-3 and 212a-4 are also formed which make a pair in a direction (a second direction) corresponding to the horizontal direction in the image-pickup range. In the following description, the aperture formed in the stop 212 is referred to as a stop aperture. The first direction and the second direction are referred to as the vertical direction and the horizontal direction, respectively.

On the right portion of the stop 212, two pairs of stop apertures 212b-1, 212b-2, and 212b-3, 212b-4 are formed which make pairs in the vertical direction and the horizontal direction, respectively. On the left portion of the stop 212, two pairs of stop apertures 212c-1, 212c-2, and 212c-3, 212c-4 are formed which make pairs in the vertical direction and the horizontal direction, respectively.

In FIG. 4A, prism portions associated with the stop apertures are formed on the entrance side of the secondary image-forming lens unit 213. Specifically, at the center of the entrance surface, two pairs of prism portions 213a-1, 213a-2, and 213a-3, 213a-4 are formed which make pairs in the vertical direction and the horizontal direction, respectively. On the right portion of the entrance surface, two pairs of prism portions 213b-1, 213b-2, and 213b-3, 213b-4 are formed which make pairs in the vertical direction and the horizontal direction, respectively. On the left portion of the entrance surface, two pairs of prism portions 213c-1, 213c-2, and 213c-3, 213c-4 are formed which make pairs in the vertical direction and the horizontal direction, respectively.

In FIG. 4B, lens portions formed of spherical surfaces and associated with the prism portions in FIG. 4A are formed on the emergence side of the secondary image-forming lens unit 213. At the center of the emergence surface, two pairs of lens portions 214a-1, 214a-2, and 214a-3, 214a-4 are formed which make pairs in the vertical direction and the horizontal direction, respectively. On the right portion (on the right when viewed from the entrance side and on the left in FIG. 4B), two pairs of lens portions 214b-1, 214b-2, and 214b-3, 214b-4 are formed which make pairs in the vertical direction and the horizontal direction, respectively. On the left portion (on the left when viewed from the entrance side and on the right in FIG. 4B), two pairs of lens portions 214c-1, 214c-2, and 214c-3, 214c-4 are formed which make pairs in the vertical direction and the horizontal direction, respectively.

In FIG. 5, light-receiving element arrays associated with the lens portions in FIG. 4B are formed on the light-receiving sensor 215. At the center of the sensor 215, two pairs of light-receiving element arrays 215a-1, 215a-2, and 215a-3, 215a-4 are formed which make pairs in the vertical direction and the horizontal direction, respectively. On the right portion of the sensor 215, two pairs of light-receiving element arrays 215b-1, 215b-2, and 215b-3, 215b-4 are formed which make pairs in the vertical direction and the horizontal direction, respectively. On the left portion of the sensor 215, two pairs of light-receiving element arrays 215c-1, 215c-2, and 215c-3, 215c-4 are formed which make pairs in the vertical direction and the horizontal direction, respectively.

The apertures, the prism portions, the lens portions, and the light-receiving element arrays with the reference numerals including the subscripts a, b, and c in FIGS. 3 to 5 correspond to the apertures of the field mask 210 and the lens portions of the field lens 211 with the reference numerals including the subscripts a, b, and c in FIG. 2.

For example, a luminous flux passes through the mask aperture 210b, passes through the field lens 211b, and passes through the two pairs of stop apertures 212b-1, 212b-2, and 212b-3, 212b-4, so that the luminous flux is split into four luminous fluxes. The four luminous fluxes enter the two pairs of prism portions 213b-1, 213b-2, and 213b-3, 213b-4 in the secondary image-forming lens unit 213 and emerge from the two pairs of lens portions 214b-1, 214b-2, and 214b-3, 214b-4, respectively. The four luminous fluxes emerge from the two pairs of lens portions and then form four aperture images associated with the mask aperture 210b on the two pairs of light-receiving element arrays 215b-1, 215b-2, and 215b-3, 215b-4 in the light-receiving sensor 215.

Four crosses 216-1, 216-2, 216-3, and 216-4 shown by dotted lines in FIG. 5 represent the aperture images, in which the aperture images 216-1 and 216-2 make a pair, and the aperture images 216-3 and 216-4 make a pair.

In the focus detection apparatus 208 structured as described above, defocus from the predetermined image-forming plane of the image-pickup lens 201 causes paired optical images (secondary optical images) to be moved closer to each other or away from each other within the paired aperture images.

For example, the optical images within the paired aperture images 216-1 and 216-2 are moved in the vertical direction. The movement can be detected by arranging the paired light-receiving element arrays in the vertical direction as shown in FIG. 5. Specifically, the distribution of light amount in the optical images is detected on the basis of the output from the light-receiving element arrays 215b-1 and 215b-2, and the interval between the optical images is determined with well-known correlation calculations to determine the deviation of the calculated interval between the optical images from the interval between the optical images when the image-pickup lens 201 is in an in-focus state.

The relationship between the deviation of the interval between the optical images and the defocus amount of the image-pickup lens 201 is approximated by using a polynomial including the deviation as a variable and stored in advance, thereby allowing the estimation of the defocus amount of the image-pickup lens 201. The result of the estimation can be used to perform focus detection of the image-pickup lens 201 (calculation of the driving amount of the focus lens). The same principles of the focus detection are used for the light-receiving element arrays 215b-3 and 215b-4 except that the vertical direction in the abovementioned description for the light-receiving element arrays 215b-1 and 215b-2 is replaced with the horizontal direction.

Each of the light-receiving element arrays 215b-1 and 215b-2 includes a plurality of light-receiving elements arranged in the vertical direction. Thus, the paired light-receiving element arrays 215b-1 and 215b-2 are suitable for focus detection of an object having a contrast component in the vertical direction. On the other hand, each of the light-receiving element arrays 215b-3 and 215b-4 includes a plurality of light-receiving elements arranged in the horizontal direction, so that the paired light-receiving element arrays 215b-3 and 215b-4 are suitable for focus detection of an object having a contrast component in the horizontal direction. The focus detection results of both pairs can be combined to achieve focus detection of a so-called cross type which is not affected by the direction of a contrast component of an object.

While the above description has been made of the focus detection optical system formed of the elements with the reference numerals including the subscript b, the same description applies to the focus detection optical system formed of the elements with the reference numerals including the subscript a or c.

Figure 6:
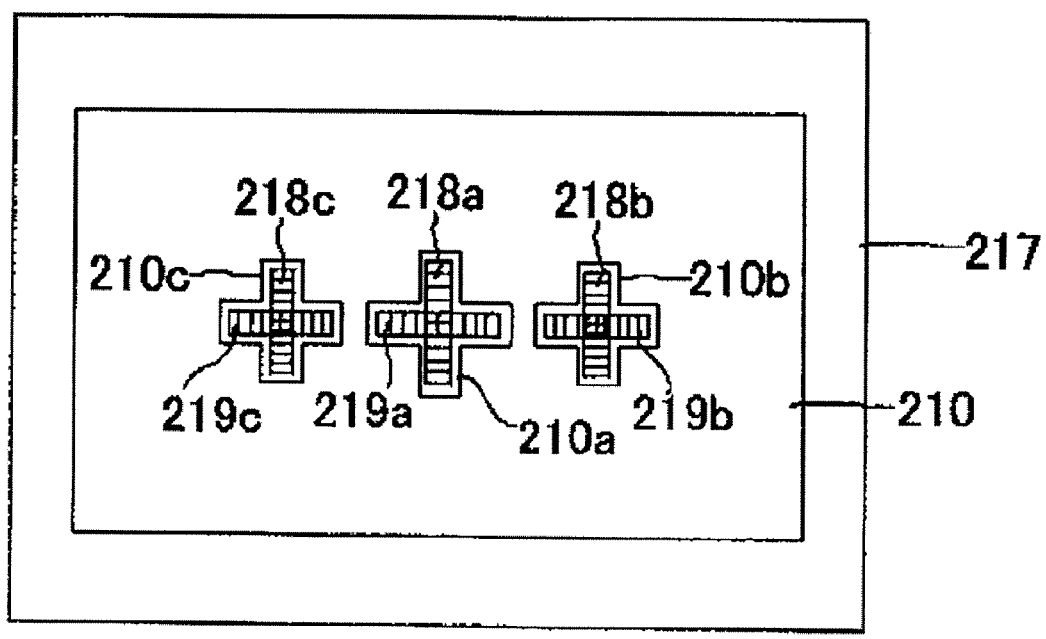
FIG. 6 shows each light-receiving element array back-projected onto the field mask in Embodiment 1.

FIG. 6 shows the light-receiving element arrays of the light-receiving sensor 215 projected back onto the field mask 210. Since the field mask 210 is placed close to the predetermined image-forming plane of the image-pickup lens 201, it can be safely said that the representation in FIG. 6 is regarded as the predetermined image-forming plane.

In FIG. 6, a rectangle 217 shown by a box somewhat larger than the field mask 210 corresponds to the image-pickup range serving as the screen subjected to image conversion by the image-pickup element 204 in the image (image circle) formed by the image-pickup lens 201. In the three mask apertures 210a, 210b, and 210c, back-projected images 218a, 218b, 218c, 219a, 219b, and 219c of the light-receiving element arrays are formed and shown as the cross areas. Since the paired light-receiving element arrays coincide on the predetermined image-forming plane, they overlap in FIG. 6. The back-projected images 218a, 218b, 218c, 219a, 219b, and 219c are provided by back-projection of the light-receiving element arrays, so that the distribution of light amount in an object can be detected in those cross areas. In other words, the back-projected images serve as so-called cross focus detection areas.

In Embodiment 1, three cross focus detection areas are provided at the center and in the two off-axis areas of the image-pickup range 217, and focus detection can be performed by using an object image in any of the three focus detection areas. Since the cross focus detection area extends in two orthogonal directions, focus detection can be performed in almost all objects regardless of the direction of a contrast component of an object. The off-axis area (or simply off-axis) refers to an area at a larger distance from the optical axis L (see FIG. 2) relative to the central portion serving as an axial area including the optical axis L.

The focus detection apparatus preferably includes a plurality of focus detection areas located away from the center as far as possible. In view of the fact that it should be incorporated into the camera, the focus detection system desirably has a reduced overall length to provide a smaller size of the entire apparatus. In addition, from the viewpoint of manufacture cost, the light-receiving sensor desirably occupies the smallest possible area since it accounts for a large proportion of cost in the focus detection apparatus.

To satisfy the abovementioned requirements and realize the optimal focus detection system, the off-axis apertures of the field mask 210 are placed away from the intersection with the optical axis L as far as possible. The optical axis L refers to the axis extended from the optical axis L of the image-pickup lens 201 shown in FIG. 1, that is, the axis corresponding to the optical axis L, and the axis folded by the sub mirror 203 and reaching the position in the focus detection apparatus 208 corresponding to the center of the image-pickup range, that is, the central axis of the focus detection apparatus 208. The optical axis L can be referred to as the central optical axis in the focus detection apparatus (focus detection optical system).

The focus detection apparatus 208 desirably has the structure in which luminous fluxes pass through the mask apertures 210a, 210b, and 210c, are refracted significantly by the field lens 211 toward the optical axis L, pass through the stop 212 and the secondary image-forming lens unit 213, and converge to the light-receiving sensor 215. However, the refraction of the luminous flux leads to aberration. The significant refraction by the field lens 211 results in various types of aberration such as astigmatism, comatic aberration, and chromatic aberration causing degraded image-forming performance, which makes it difficult to provide the secondary optical image adequate for satisfactory focus detection. In focus detection with the phase difference detection method, the interval between paired secondary optical images needs to be consistent regardless of the image height and wavelength. Thus, the following two points are particularly important in performance of the secondary optical image.

(1) Distortion of the paired secondary optical images in the moving direction thereof should be symmetric with respect to the center of the secondary optical images.

(2) No chromatic aberration of magnification should be present in the paired secondary optical images in the moving direction thereof.

When the field lens significantly refracts the light as in Embodiment 1, the aberration described in (2) needs to be completely removed since chromatic aberration is caused by the prism effect.

To achieve this, in Embodiment 1, the direction of the chromatic aberration and the means for removing the chromatic aberration can be appropriately set to realize the cross-type focus detection apparatus less susceptible to a change in ambient environments in the off-axis area. Description will hereinafter be made of the structure of the focus detection system for the off-axis area. In the following description, an element with a reference numeral including a subscript a is included in a focus detection system for the center of the image-pickup range. That system is well known and thus the description thereof is omitted.

First, description will be made of the focus detection areas 218b and 218c extending in the vertical direction, of the focus detection areas provided in the off-axis areas of the image-pickup range (hereinafter referred to simply as the off-axis focus detection areas).

Figure 7:
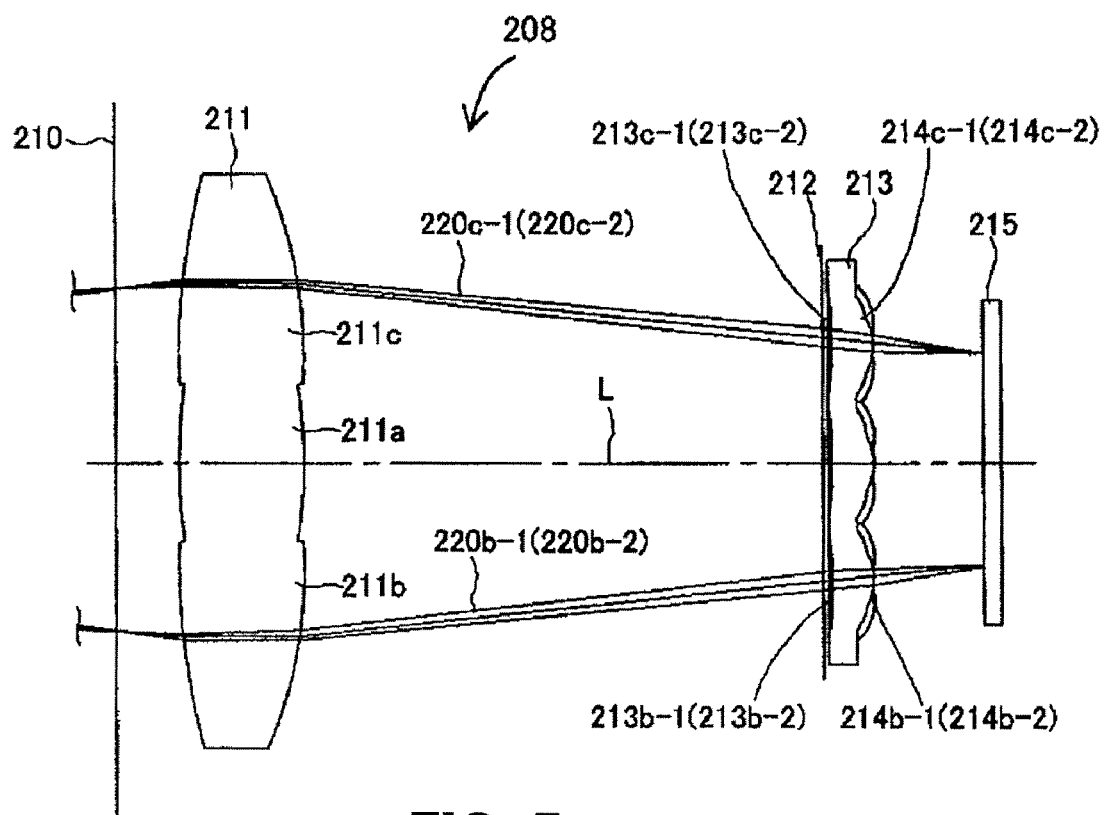
FIG. 7 is an optical section view showing the focus detection apparatus of Embodiment 1 viewed from above.

FIG. 7 shows an optical section when the focus detection apparatus 208 is viewed from above. Reference numerals 220b-1 (220b-2) and 220c-1 (220c-2) show luminous fluxes which emerge from the image-pickup lens 201, form images on the centers of the cross mask apertures 210b and 210c, and pass through the stop apertures 212b-1 (212b-2) and 212c-1 (212c-2), respectively. In other words, of paired luminous fluxes for the off-axis focus detection areas 218b and 218c, the luminous fluxes 220b-1 (220b-2) and 220c-1 (220c-2) form images on the centers of the paired light-receiving element arrays 215b-1, 215b-2 and 215c-1, 215c-2, respectively. Since the members paired in the vertical direction have shapes symmetric with respect to the horizontal plane including the optical axis L, the paired members overlap in FIG. 7.

The paired luminous fluxes 220b-1 and 220b-2, 220c-1 and 220c-2 are greatly refracted by the field lens 211 toward the optical axis L. They enter the secondary image-forming lens unit 213 through the planar prism portions 213b-1 and 213c-1, emerge from the spherical lens portions 214b-1 and 214c-1, and form images on the light-receiving sensor 215. Thus, on the light-receiving sensor 215, chromatic aberration occurs in a direction in parallel with the section of FIG. 7 due to the prism effect from the refraction by the field lens 211.

However, the paired luminous fluxes 220b-1, 220b-2 and 220c-1, 220c-2 are associated with the paired light-receiving element arrays 215b-1, 215b-2, and 215c-1, 215c-2 shown in FIG. 5, so that the direction (correlation direction) of detection of the interval between optical images is orthogonal to the direction of the chromatic aberration. The abovementioned aberrations described in (1) and (2) which are important to the secondary optical images in the focus detection system are produced in the direction of detection of the interval between optical images. Therefore, the chromatic aberration in the direction in parallel with the section of FIG. 7 has almost no influence on the focus detection.

The abovementioned chromatic aberration can be corrected by optimizing the angle of the prism portion and the positional relationship between the stop aperture, the prism portion, and the lens portion in the direction of the aberration. However, the chromatic aberration does not affect the focus detection performance, so that the secondary image-forming lens unit 213 of Embodiment 1 in this section is placed by taking account of splitting of the luminous flux in the secondary image-forming lens unit 213 without considering the correction of the chromatic aberration. The luminous flux splitting will be described later in detail.

On the other hand, in the optical section orthogonal to FIG. 7, the paired focus detection optical systems are similar to those at the center formed of the elements with the reference numerals including the subscript a. Known aberration correction can be performed to provide the performance described above in (1) and (2).

Figure 8:
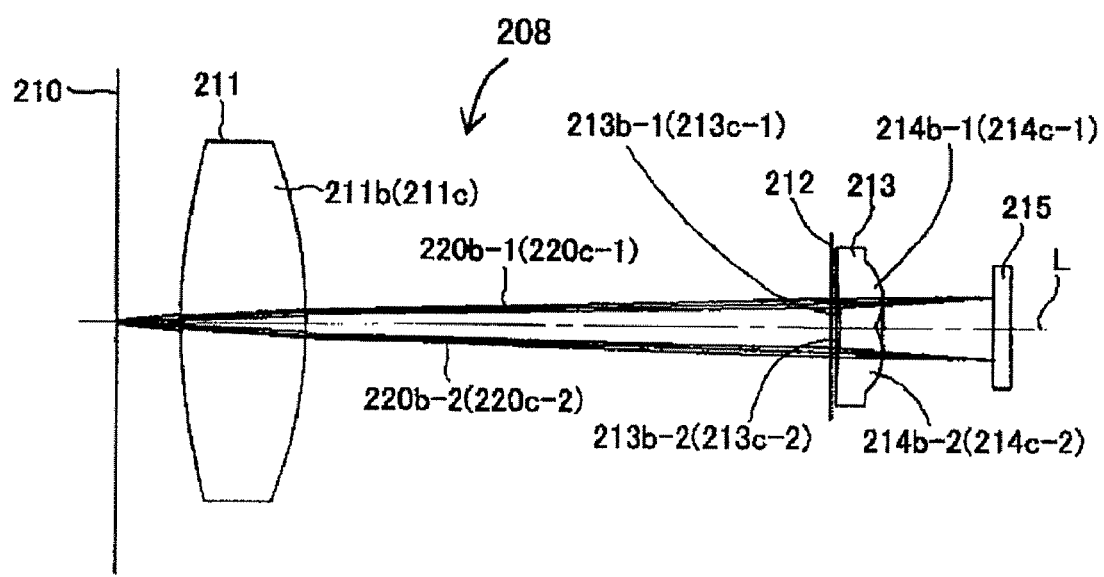
FIG. 8 is an optical section view showing the focus detection apparatus of Embodiment 1 viewed from the side.

FIG. 8 shows the optical section when the focus detection apparatus 208 is viewed from the side. In the section, the elements with the reference numerals including the subscript b and c overlap. In paired luminous fluxes 220b-1 (220c-1) and 220b-2 (220c-2), principal rays thereof are hardly refracted.

The paired prism portions 213b-1 and 213b-2 in the secondary image-forming lens unit 213 are formed of planes inclined the same angles toward the optical axis L. The paired lens portions 214b-1 and 214b-2 are formed of spherical surfaces with their centers located near the centers of the associated stop apertures 212b-1 and 212-b2.

As apparent from FIGS. 7 and 8, the normal vectors of the planes of the paired prism portions 213b-1 and 213b-2 are inclined only in the direction of the section of FIG. 8.

Since the section of FIG. 8 corresponds to the direction of detection of the interval between secondary optical images, the aberrations in (1) and (2) are corrected naturally. In addition, as described above, when the principal rays which form images on the centers of the light-receiving element arrays are hardly refracted, the aberrations in (1) and (2) can be easily corrected only by a slight degree of optimization of the secondary image-forming lens unit 213.

The paired focus detection optical systems associated with the focus detection areas 218b and 218c are symmetric with respect to the plane orthogonal to the line segments connecting the aperture centers (or aperture barycenters) of the paired stop apertures 212b-1, 212b-2 and 212c-1, 212c-2 and halving the line segment. In other words, the paired focus detection optical systems are symmetric in the direction of detection of the interval between secondary optical images.

Next, description will be made of the focus detection areas 219b and 219c extending in the horizontal direction, of the off-axis focus detection areas shown in FIG. 6.

Figure 9:
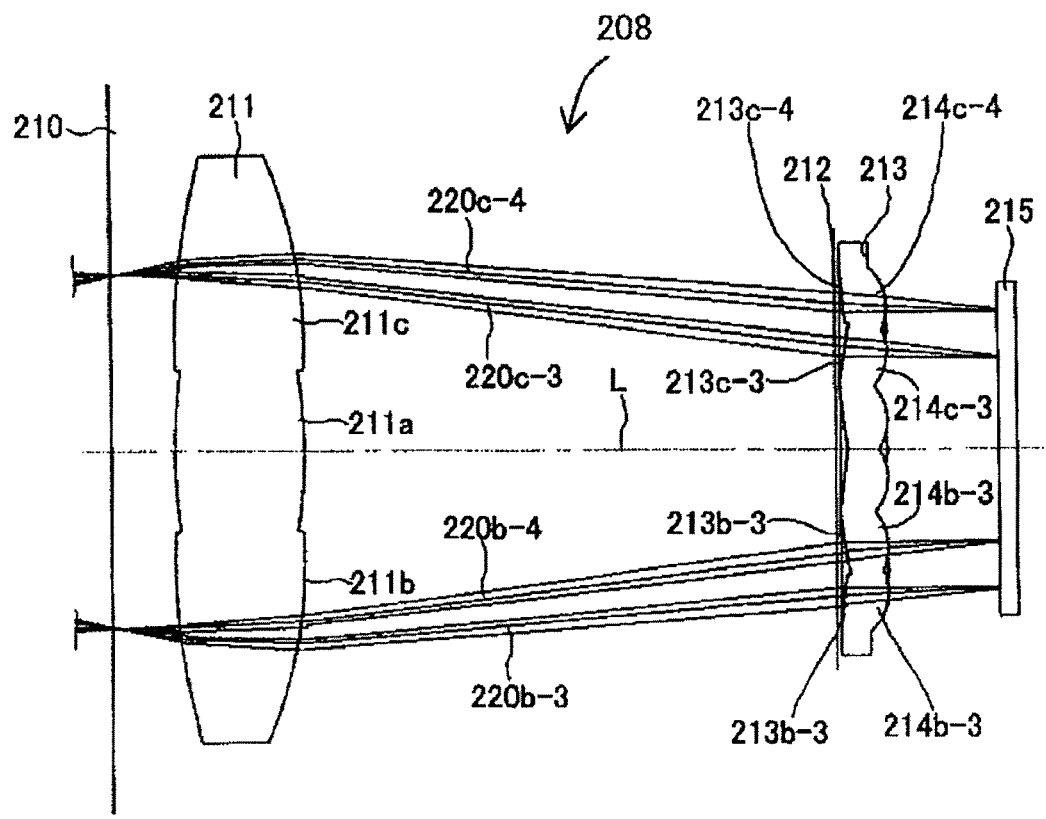
FIG. 9 is an optical section view showing the focus detection apparatus of Embodiment 1 viewed from above.

FIG. 9 shows the optical section when the focus detection apparatus 208 is viewed from above similarly to FIG. 7. Reference numerals 220b-3, 220b-4 and 220c-3, 220c-4 show luminous fluxes which pass through the image-pickup lens 201, form images on the centers of the mask apertures 210b and 210c, and pass through the paired stop apertures 212b-3, 212b-4 and 212c-3, 212c-4, respectively, in FIG. 3. In other words, of paired luminous fluxes for the off-axis focus detection areas 219b and 219c, the luminous fluxes 220b-3, 220b-4 and 220c-3, 220c-4 form images on the centers of the paired light-receiving element arrays 215b-3, 215b-4 and 215c-3, 215c-4.

The paired luminous fluxes 220b-3 and 220b-4, 220c-3 and 220c-4 are greatly refracted by the field lens 211 toward the optical axis L and enter the secondary image-forming lens unit 213, similarly to the luminous fluxes in FIG. 7.

Since the luminous fluxes are significantly refracted by the field lens 211, various types of aberration such as chromatic aberration occur in the secondary image-forming system. However, unlike the situations in FIGS. 7 and 8, the direction of the chromatic aberration corresponds to the direction of detection of the interval between secondary optical images by the paired light-receiving element arrays 215b-3, 215b-4, 215c-3, and 215c-4. In addition, since the refraction angle by the field lens 211 is different between the paired luminous fluxes 220b-3 and 220b-4 and between the paired luminous fluxes 220c-3 and 220c-4 which enter the secondary image-forming lens unit 213, the aberration occurs in various degrees.

Thus, in Embodiment 1, the abovementioned chromatic aberration is corrected by optimizing the angle of the prism portion and the positional relationship between the stop aperture, the prism portion, and the lens portion in the direction of the aberration. Since the aberration occurs in different degrees between the paired luminous fluxes, the correction amount is also different between the paired luminous fluxes. Basically, in the section of FIG. 9, the secondary image-forming optical system is formed of the paired stop apertures, the paired prism portions, and the paired lens portions having asymmetric shapes in each pair. However, in Embodiment 1, only the paired lens portions have the same shape (symmetric shape) in view of difficulty in manufacture.

With the structure, the abovementioned aberration in (2) can be corrected to the level at which focus detection is possible. The aberration in (1) is optimized by the field lens 211. The only requirement of the field lens 211 is the ability to provide the image-forming relationship between the exit pupil of the image-pickup lens 201 and the stop 212. In Embodiment 1, the aberration in (1) is removed by bending the entrance and emergence surfaces of the field lens 211 to provide uniform optical power.

On the other hand, in the section orthogonal to the section of FIG. 9, the paired focus detection optical systems are similar to those at the center formed of the elements with the reference numerals including the subscript a. Aberration in the direction orthogonal to the direction of detection of the interval between secondary optical images is not considerably problematic.

Figure 10:
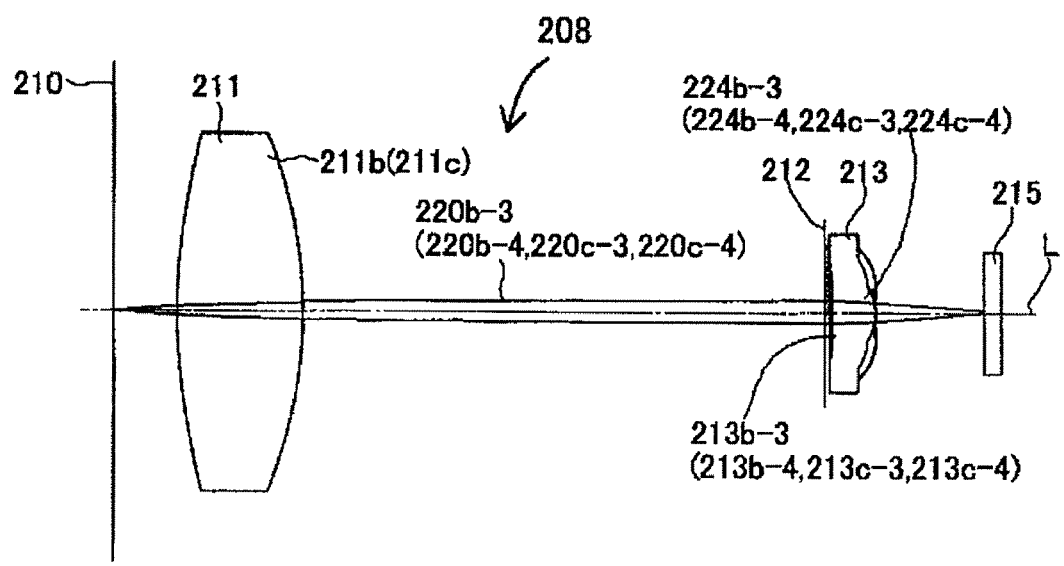
FIG. 10 is an optical section view showing the focus detection apparatus of Embodiment 1 viewed from the side.

FIG. 10 shows the optical section when the focus detection apparatus 208 is viewed from the side. In the section, the elements and the paired elements with the reference numerals including the subscript b and c overlap.

In FIG. 10, a luminous flux 220b-3 (220b-4, 220c-3, 220c-4) includes a principal ray overlapping the optical axis L and is not refracted. It is essential only that the stop aperture, the prism portion, and the lens portion are arranged such that their centers overlap the optical axis L in FIG. 10.

The paired focus detection optical systems associated with the focus detection areas 219b and 219c are asymmetric with respect to the plane orthogonal to the line segment connecting the aperture centers (or aperture barycenters) of the paired stop apertures 212b-3, 212b-4 or 212c-3, 212c-4 and halving the line segment. In other words, the paired focus detection optical systems are asymmetric in the direction of detection of the interval between secondary optical images. The focus detection optical systems provided for the focus detection areas 218b and 219b are combined to provide a characteristic positional relationship of Embodiment 1 between the stop, the lens portions, and the light-receiving element arrays.

Figure 11:
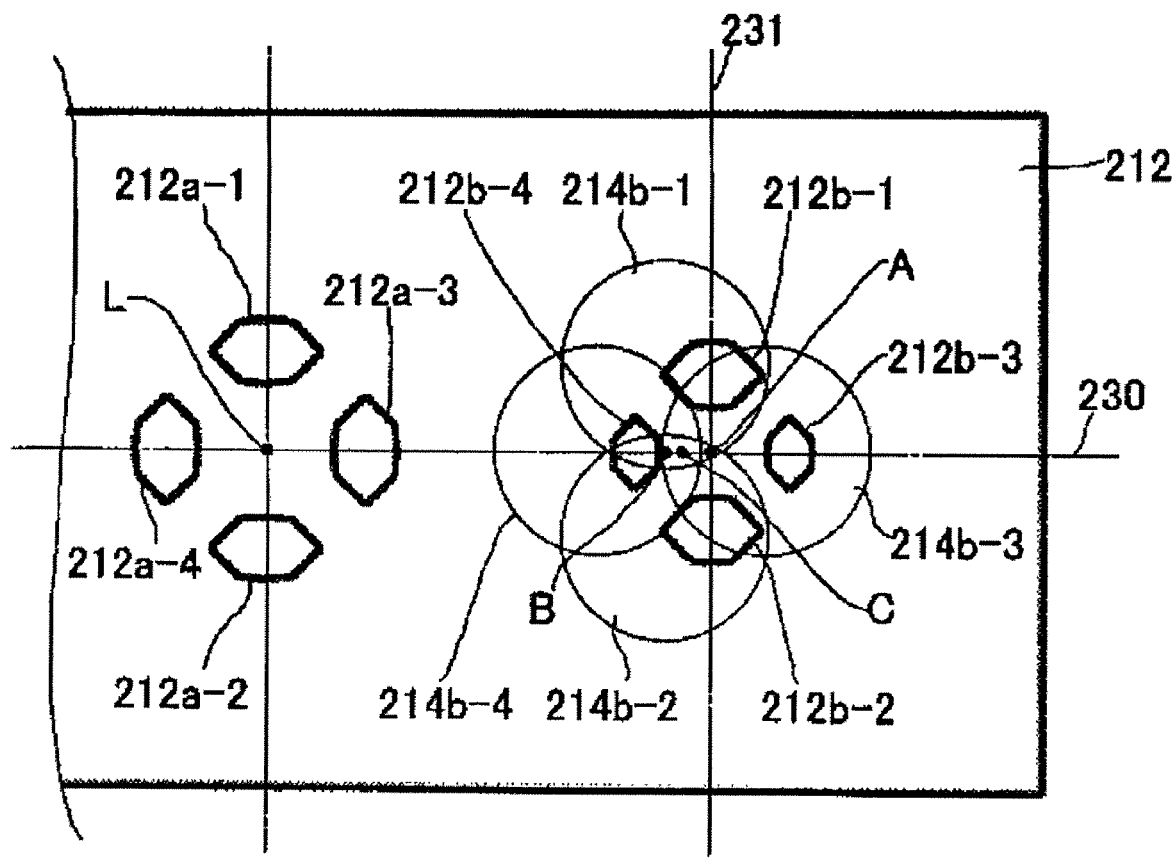
FIG. 11 shows lens portions over the stop in Embodiment 1.

FIG. 11 shows the characteristic positional relationship, in which the lens portions provided for the focus detection areas 218b and 219b overlap on the front view of the stop 212. The lens portions are shown by circles to facilitate the recognition of the lens centers (or optical axes), that is, the surface vertexes which are vertexes of the spherical surfaces of the lenses.

In FIG. 11, a point L shows the point where the optical axis L passes. The point L corresponds to both of the midpoint of the line segment connecting the centers of the paired stop apertures 212*a*-1 and 212*a*-2 in the central portion and the midpoint of the line segment connecting the centers of the paired stop apertures 212*a*-3 and 212*a*-4 in the central portion. Although not shown in FIG. 11, the point L corresponds to both of the midpoint of the line segment connecting the centers (lens surface vertexes) of the paired lens portions 214*a*-1 and 214*a*-2 in the central portion and the midpoint of the line segment connecting the centers of the paired lens portions 214*a*-3 and 214*a*-4 in the central portion.

A point A corresponds to both of the midpoint of the line segment connecting the centers of the paired stop apertures 212*b*-1 and 212*b*-2 in the off-axis area and the midpoint of the line segment connecting the centers of the paired stop apertures 212*b*-3 and 212*b*-4. When reference numeral 230 shows an extended line of the line segment connecting the centers of the paired diagraph apertures 212*b*-3 and 212*b*-4 in the horizontal direction in which the paired stop apertures 212*b*-3 and 212*b*-4 are arranged, the extended line 230 passes through the point L.

The two pairs of the stop apertures in the center and the off-axis area are projected onto the exit pupil of the image-pickup lens 201 by the field lens 211. To use the exit pupil symmetric with respect to the axis more effectively, the midpoint of the line segment connecting the centers of the one of the pairs of the stop apertures is matched to the midpoint of the line segment connecting the centers of the other of the pairs of the stop apertures. This advantageously can ensure sufficient base length to provide a fast focus detection optical system and a large focus detection area.

On the other hand, the midpoint of the line segment connecting the centers of the paired lens portions 214*b*-1 and 214*b*-2 in the off-axis area is a point B, and the midpoint of the line segment connecting the centers of the paired lens portions 214*b*-3 and 214*b*-4 is a point C. The point B does not correspond to the point C. Specifically, the point B is located closer to the point L than the point C.

This is because the paired lens portions 214*b*-3 and 214*b*-4 need to be shifted toward the optical axis L from the paired lens portions 214*b*-1 and 214*b*-2 due to the refraction of the luminous fluxes by the field lens 211 toward the optical axis L as described above. The paired lens portions 214*b*-3 and 214*b*-4 are optimized with the correction of chromatic aberration described in FIG. 9 and are arranged such that the midpoint between the centers of the lens portions corresponds to the point C.

Since aberration in the horizontal direction is not problematic in the paired lens portions 214*b*-1 and 214*b*-2, they are placed in view of the splitting of the luminous flux passing through the stop apertures 212*b*-1 and 212*b*-2. The luminous flux splitting means the optimization of the lines as the boundaries between the four spherical lens portions 214*b*-1, 214*b*-2, 214*b*-3, and 214*b*-4 to prevent the luminous flux from traveling through the lens portion other than the lens portion 214*b*-1 after it passes through the stop aperture 212*b*-1. As a result, the midpoint between the centers of the paired lens portions 214*b*-1 and 214*b*-2 corresponds to the position of the point B which is shifted closer to the optical axis L than the point C.

The structure in which the midpoints are shifted in the two pairs is used not only in the lens portions but also in the prism portions. In the paired prism portions, the line between by the two planes forming the paired prism portions is regarded as the midline. The midline between the paired prism portions 213*b*-1 and 213*b*-2 corresponds to the extended line 230 when viewed from the optical axis direction shown in FIG. 11. On the other hand, the midline between the paired prism portions 213*b*-3 and 213*b*-4 does not correspond to a line segment 231 connecting the centers of the paired stop apertures 212*b*-1 and 212*b*-2 and is shifted closer to the point L than the line segment 231. The shifted midline does not pass through the point B or C.

Since the prism portions are not located far away from the stop 212, the luminous flux splitting is performed sufficiently. Thus, the two pairs of the prism portions are uniformly divided into four in the vertical and horizontal directions as shown in FIG. 4A in view of ease of manufacture of the secondary image-forming lens unit 213, but steps are produced as shown in FIG. 9 at the vertexes of the four divided prism portions. For example, since the paired prism portions 213*b*-1 and 213*b*-2 have symmetric shapes, their vertexes match. However, the vertexes of the paired prism portions 213*b*-3 and 213*b*-4 are shifted in the direction perpendicular to the sheet of FIG. 4 from the vertexes of the paired prism portions 213*b*-1 and 213*b*-2. The steps of the prism portions may be formed such that the vertexes of the prism portions are matched and the highest step is produced at a position away from the vertexes.

Figure 12:
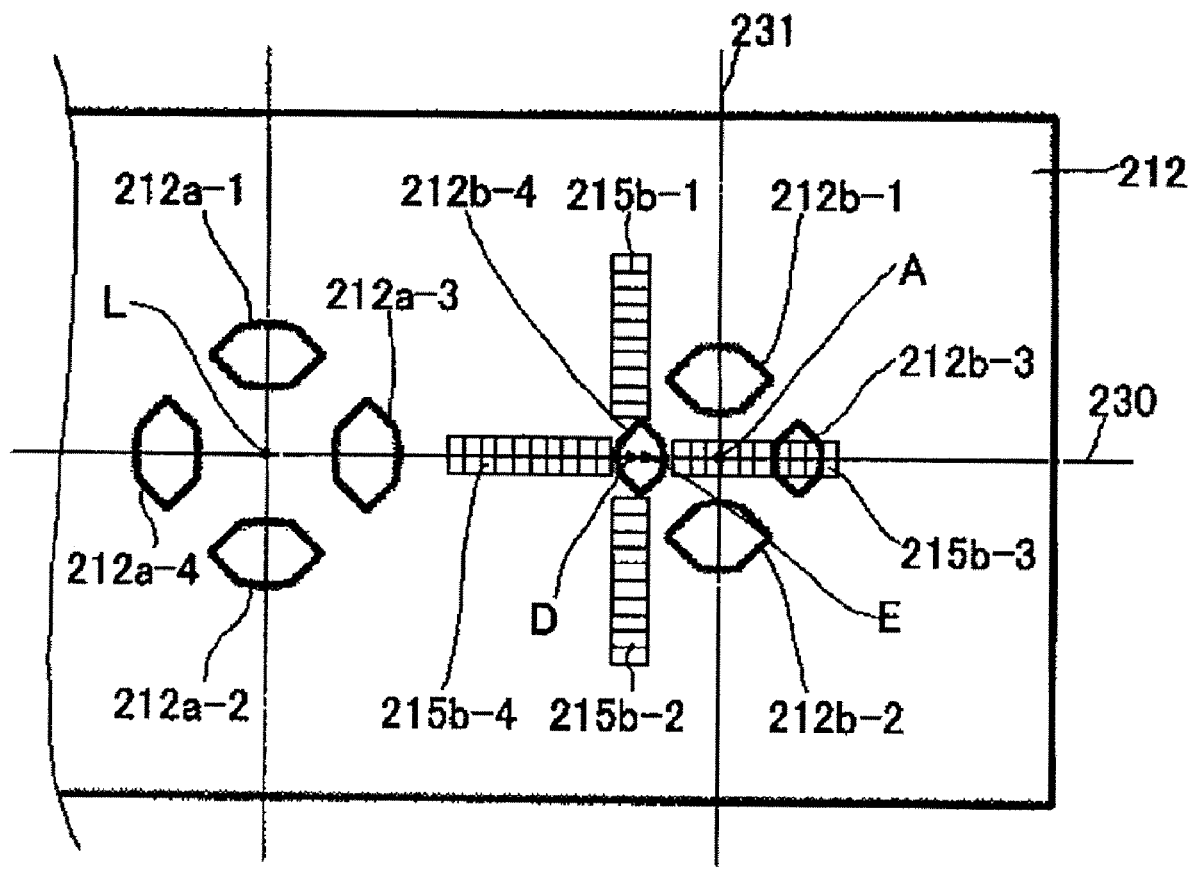
FIG. 12 shows the light-receiving element arrays over the stop in Embodiment 1.

Next, FIG. 12 shows the light-receiving element arrays provided for the focus detection areas 218*b* and 219*b* over the front view of the stop 212. In FIG. 12, a point D is the midpoint of the line segment connecting the centers of the paired light-receiving element arrays 215*b*-1 and 215*b*-2, and a point E is the midpoint of the line segment connecting the centers of the paired light-receiving element arrays 215*b*-3 and 215*b*-4. Both of the points D and E are shifted closer to the optical axis L in the direction of the extended line 230 than the abovementioned point A and the points B and C shown in FIG. 11, and the point D is shifted closer to the optical axis L than the point E.

This results from the placement of the lens portions 214*b*-1 and 214*b*-2 associated with the paired light-receiving element arrays 215*b*-1 and 215*b*-2 by putting high priority on the luminous flux splitting and the placement of the lens portions 214*b*-3 and 214*b*-4 associated with the paired light-receiving element arrays 215*b*-3 and 215*b*-4 in view of the aberration.

When the luminous flux splitting is performed sufficiently, the point D can be matched to the point E by placing the lens portions in view of the image-forming position of the secondary optical image. In Embodiment 1, however, the points D and E are not matched since they are placed with only a slight mismatch.

Figure 13A:
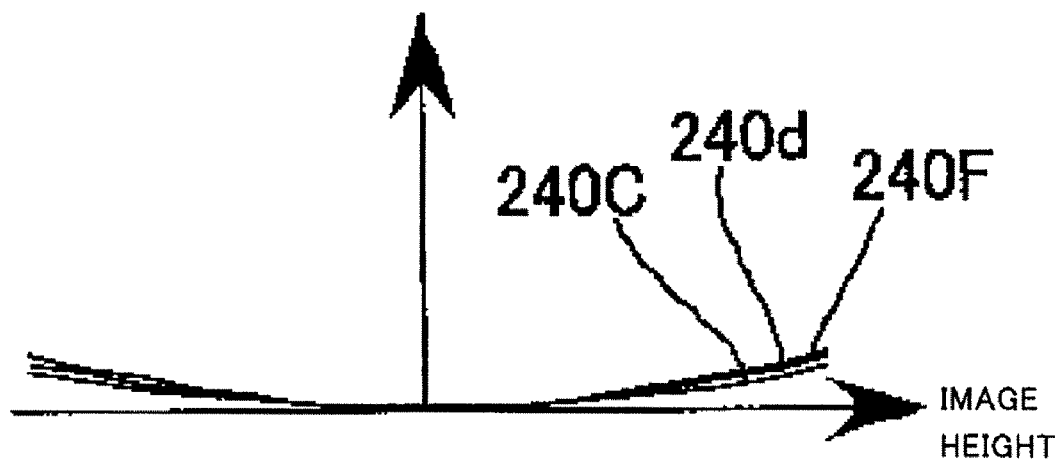
FIGS. 13A and 13B show focus detection performance in Embodiment 1.
Figure 13B:
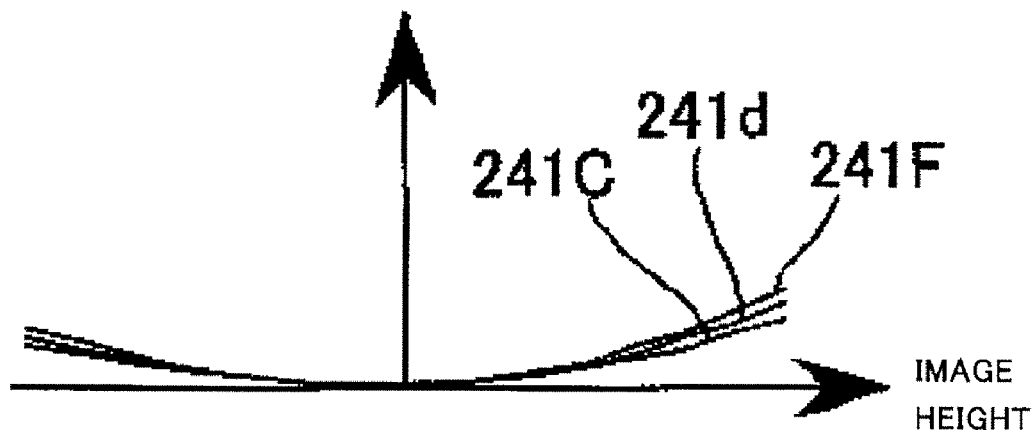

FIGS. 13A and 13B show the focus detection performance relating to the abovementioned points (1) and (2) in the off-axis focus detection areas. FIG. 13A shows the focus detection performance in the focus detection area 218*b* (or 218*c*). FIG. 13B shows the focus detection performance in the focus detection area 219*b* (or 219*c*).

In FIGS. 13A and 13B, the horizontal axis represents the image height in the direction from the center of the focus detection area toward the periphery thereof. The vertical axis represents the amount of change in the interval between paired secondary optical images when the interval between optical images is equal to zero at the center of the focus detection area. Subscripts C, d, and F are used to represent the amount of change for each wavelength and correspond to the C line (656.27 nm), the d line (587.56 nm), and the F line (486.13 nm), respectively.

In FIG. 13A, change amounts 240C, 240*d*, and 240F of the interval between optical images are symmetric with respect to the vertical axis and involve small variations depending on the image height and wavelength, which shows that the change amounts are corrected favorably.

In FIG. 13B, change amounts 241C, 241*d*, and 241F of the interval between optical images are asymmetric with respect to the vertical axis. This is because the elements forming the secondary image-forming optical system provided for the focus detection area 219b (219c) are asymmetrical in each pair. In Embodiment 1, however, the change amounts 241C, 241d, and 241F of the interval between optical images are corrected to the level at which focus detection is possible, although they include slightly larger variations depending on the image height and wavelength as compared with the change amounts in FIG. 13A.

The structure described above realizes the focus detection in the cross-type phase difference detection method in the off-axis area.

Next, description will be made of the advantage of Embodiment 1 when a change in ambient environments occurs such as temperature and humidity.

Expansion or shrinkage of the members forming the focus detection optical system due to a change in ambient environments varies the interval between paired secondary optical images to provide the focus detection result different from that at ordinary temperatures. For this reason, in a conventional approach, a change in the interval between secondary optical images due to a temperature change is measured in advance and held as data, and the focus detection result is corrected on the basis of the measurement data and the output from a temperature sensor or a humidity sensor provided for the focus detection apparatus. However, if the paired secondary optical images are displaced in a direction other than the direction of the detection of the interval, the focus detection result varies depending on an object.

In the focus detection system, it is thus important to prevent a displacement of optical images in a direction other than the direction of detection of the interval between images resulting from an environmental change. A predominant cause of such a displacement of optical images in a direction other than the interval detection direction is a change in shape of the secondary image-forming lens unit 213 of the focus detection optical system. For this reason, in Embodiment 1, the secondary image-forming lens unit 213 is structured such that a displacement of optical images is unlikely to occur in a direction other than the interval detection direction due to an environmental change.

In a direction orthogonal to the direction of detection of the interval between paired secondary optical images (hereinafter referred to as an image interval orthogonal direction), as shown in FIGS. 7 and 10, the secondary image-forming lens unit 213 is formed to such that a principal ray of the luminous flux forming an image at the center of the aperture of the field mask 210 is hardly refracted. The lens portions formed on the emergence side of the secondary image-forming lens unit 213 are made of spherical lenses having the same shape in each pair. As a result, an image displacement due to an environmental change is unlikely to occur in the image interval orthogonal direction.

Figure 14:
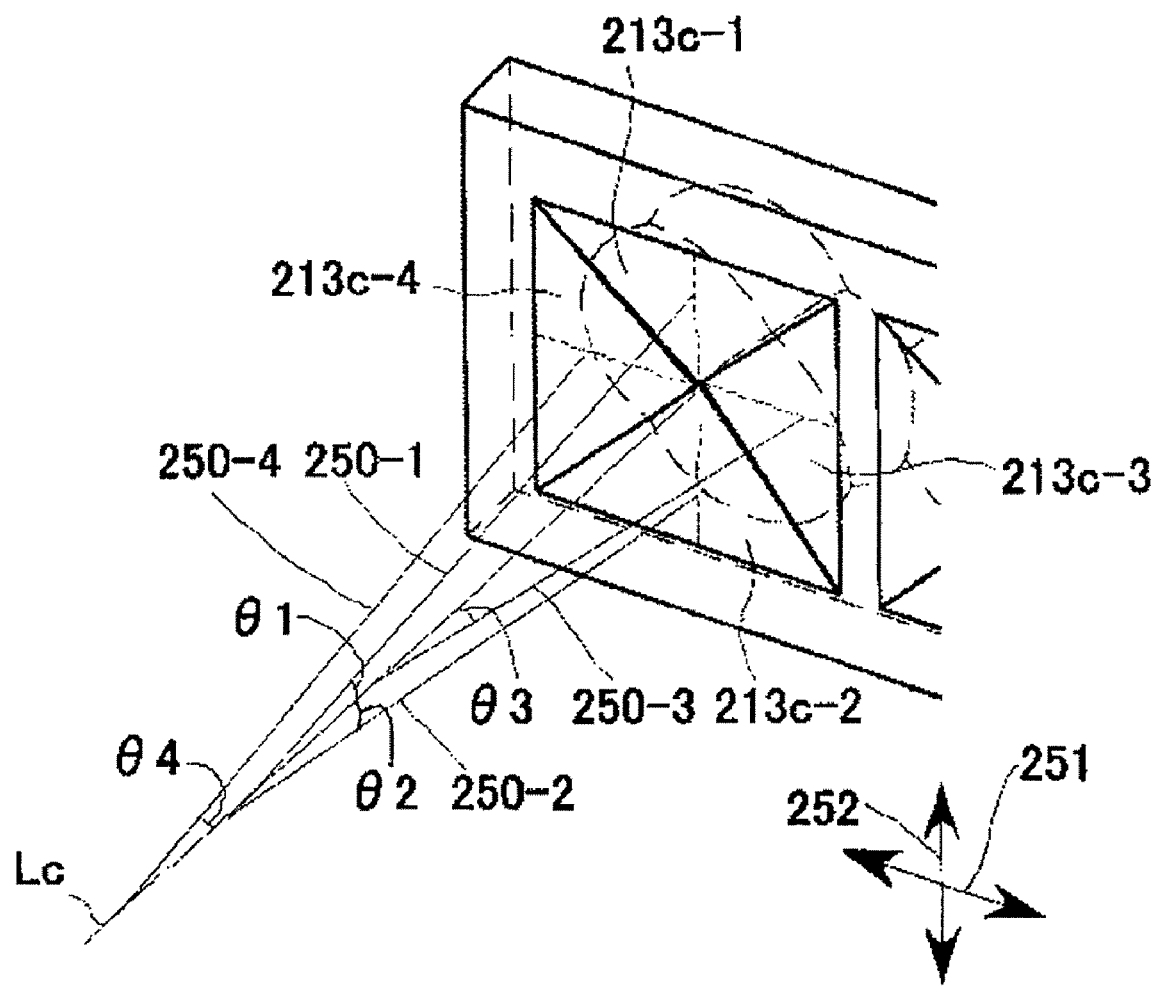
FIG. 14 is a perspective view showing an enlarged part of the secondary image-forming lens unit in Embodiment 1.

FIG. 14 is an enlarged view showing the prism portions associated with the off-axis focus detection areas 218c and 219c of the prism portions formed on the entrance side of the secondary image-forming lens unit 213. In FIG. 14, an optical axis Lc is parallel with the optical axis L and passes through the vertex of the prism portion in FIG. 4A.

Reference numerals 250-1, 250-2, 250-3, and 250-4 represent the normal vectors at the barycenters of the prism portions 213c-1, 213c-2, 213c-3, and 213c-4, respectively.

The normal vectors 250-1 and 250-2 of the paired prism portions 213c-1 and 213c-2 intersect the optical axis Lc at the same point and form the equal angles θ1 and θ2 with respect to the optical axis Lc. Specifically, the optical axis Lc and the normal vectors 250-1 and 250-2 are present on the same plane which is the vertical plane. The image interval orthogonal direction of the paired prism portions 213c-1 and 213c-2 is shown by an arrow 251. Since the paired prism portions 213c-1 and 213c-2 are not inclined in the direction of the arrow 251, an image displacement due to an environmental change is more unlikely to occur in the image interval orthogonal direction.

Even when the prism surface is deformed due to an environmental change, the deformation is caused with the same degrees in the paired prism portions 213c-1 and 213c-2 since no difference in inclination is present between the prism portions 213c-1 and 213c-2 in the direction of the arrow 251. Thus, an image displacement is unlikely to occur in the image interval orthogonal direction.

The normal vectors 250-3 and 250-4 of the paired prism portions 213c-3 and 213c-4 intersect the optical axis Lc at the different points and form different angles θ3 and θ4 with respect to the optical axis Lc. The optical axis Lc and the normal vectors 250-3 and 250-4 are present on the same plane which is the horizontal plane. The image interval orthogonal direction of the paired prism portions 213c-3 and 213c-4 is shown by an arrow 252. The paired prism portions 213c-3 and 213c-4 are not inclined in the direction of the arrow 252, so that an image displacement due to an environmental change is unlikely to occur in the image interval orthogonal direction. When the prism surface is deformed due to an environmental change, the deformation is caused differently in the direction of the arrow 251 due to the different angles θ3 and θ4. Since this affects only the interval between paired optical images, correction may be performed by the abovementioned known means.

In the direction of the arrow 252, deformation is caused with the same degrees since no difference in inclination is present between the prism portions 213c-3 and 213c-4. Thus, an image displacement is unlikely to occur in the image interval orthogonal direction.

While Embodiment 1 has been described in conjunction with the focus detection apparatus which is contained in the single-lens reflex camera, the present invention is not limited thereto and the focus detection apparatus may be mounted on another optical apparatus. In addition, Embodiment 1 has been described in conjunction with the focus detection apparatus including the secondary image-forming system which forms a secondary optical image on the light-receiving sensor, but embodiments of the present invention includes a focus detection apparatus including a primary image-forming system.

Embodiment 2

Figure 15A:
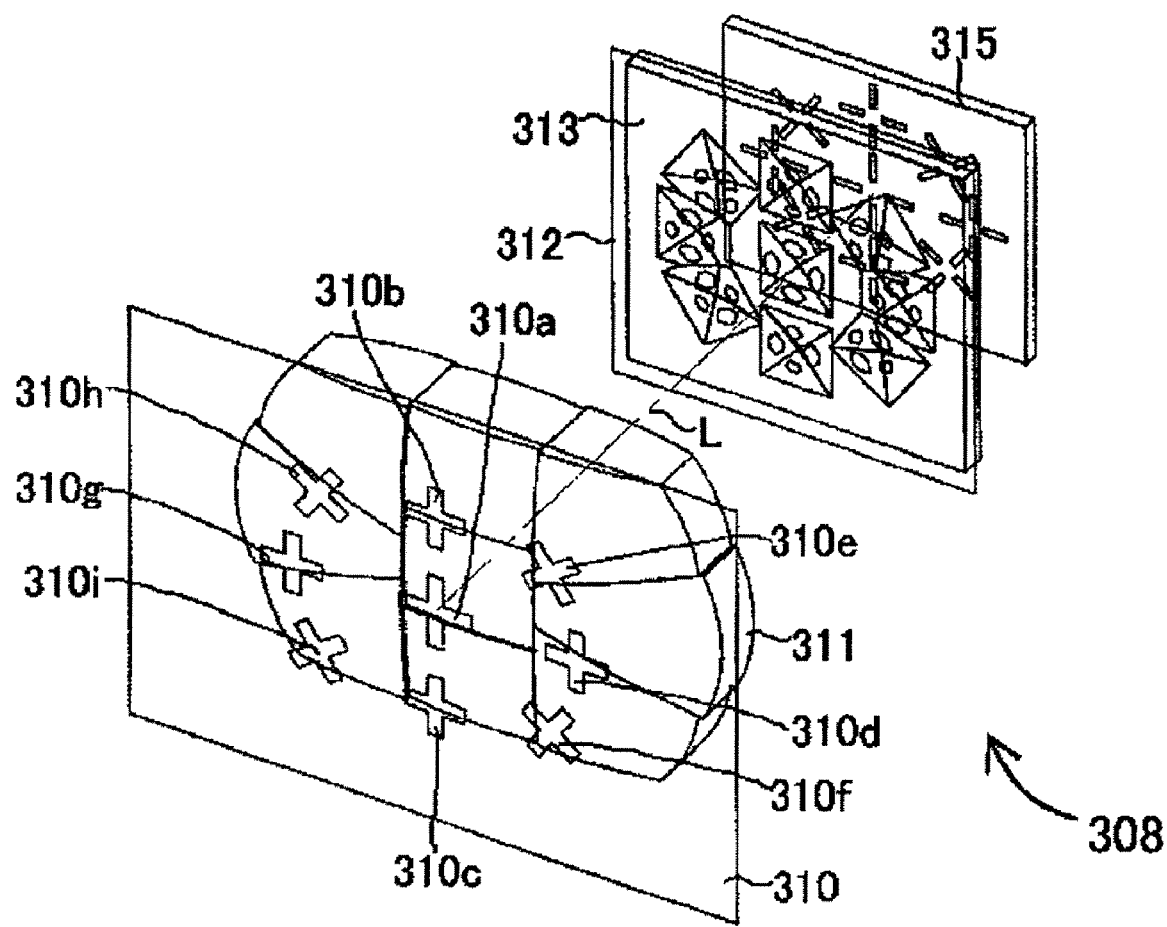
FIG. 15A is a perspective view showing a focus detection apparatus which is Embodiment 2 of the present invention.
Figure 15B:
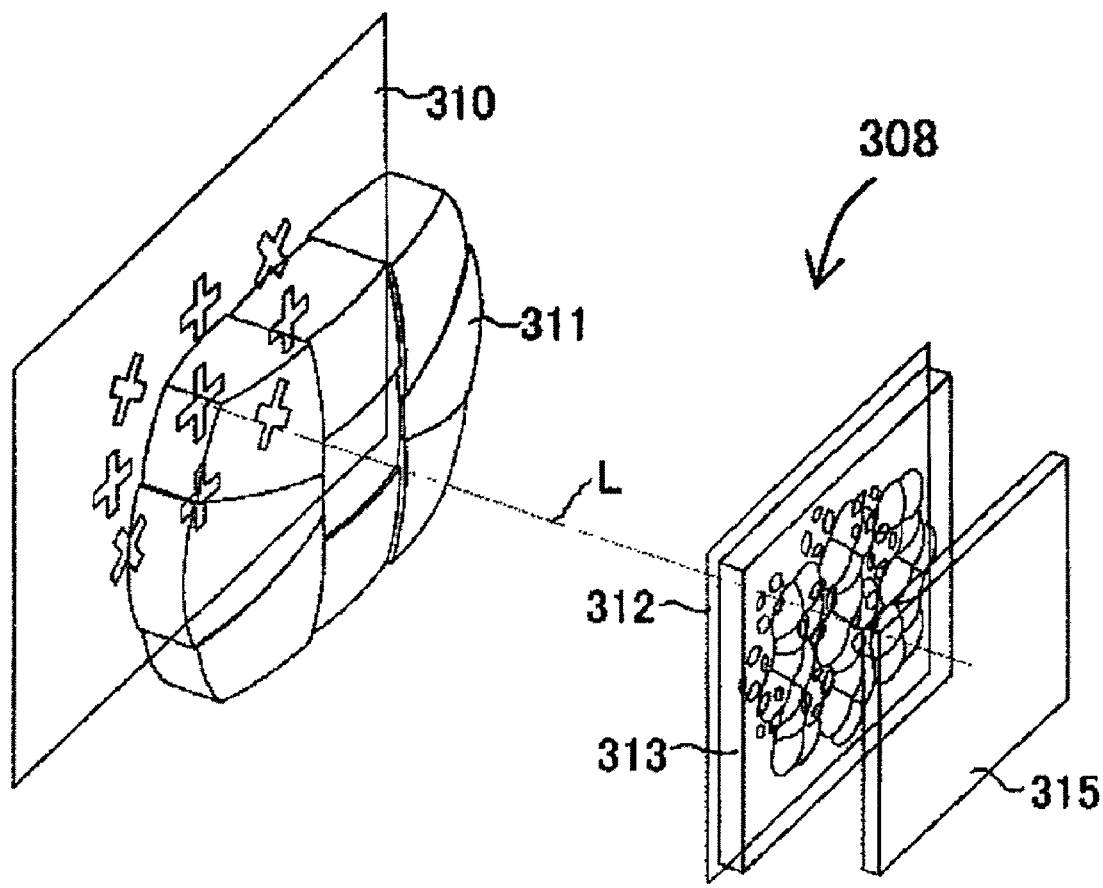
FIG. 15B is a perspective view showing the focus detection apparatus of Embodiment 2.

FIGS. 15A and 15B show the structure of a focus detection apparatus which is Embodiment 2 of the present invention. Embodiment 2 is a modification of Embodiment 1 and includes an increased number of cross focus detection areas in an image-pickup range as compared with Embodiment 1.

In FIGS. 15A and 15B, a focus detection apparatus 308 includes a field mask 310, a field lens 311, a stop 312, a secondary image-forming lens unit 313, and a light-receiving sensor 315.

The field mask 310 has nine mask apertures 310a to 310i formed therein in a cross shape and associated with nine focus detection areas. The field lens 311, the stop 312, the secondary image-forming lens unit 313, and the light-receiving sensor 315 have a lens portion, two pairs of stop apertures, two pairs of prism portions and two pairs of lens portions, and two pairs of light-receiving element arrays, respectively, for each of the focus detection areas. This structure allows cross-type focus detection at nine positions in the image-pickup range.

The basic ideas for the field mask 310, the field lens 311, the stop 312, the secondary image-forming lens unit 313, and the light-receiving sensor 315 are identical to those in Embodiment 1.

For example, the structures of focus detection optical systems associated with the mask apertures 310b, 310c, 310d, and 310g are identical to those of the focus detection optical systems associated with the off-axis focus detection areas 210b, 210c described in Embodiment 1. Focus detection optical systems associated with the four focus detection areas 310e, 310f, 310h, and 310i placed at diagonal positions in the image-pickup range correspond to those associated with the off-axis focus detection areas 210b, 210c in Embodiment 1 rotated about the optical axis L clockwise or counterclockwise.

The optical axis L is present on the extended line of one of the extension directions of the cross focus detection areas placed at the diagonal positions, that is, of the direction of placement of one of two pairs of stop apertures.

The structure as described above can realize the cross-type focus detection in a number of focus detection areas placed over a wide region of the image-pickup range. Embodiment 2 can achieve the similar effects to those in Embodiment 1 in terms of an environmental change and the contrast component of an object.

Embodiment 3

Figure 16A:
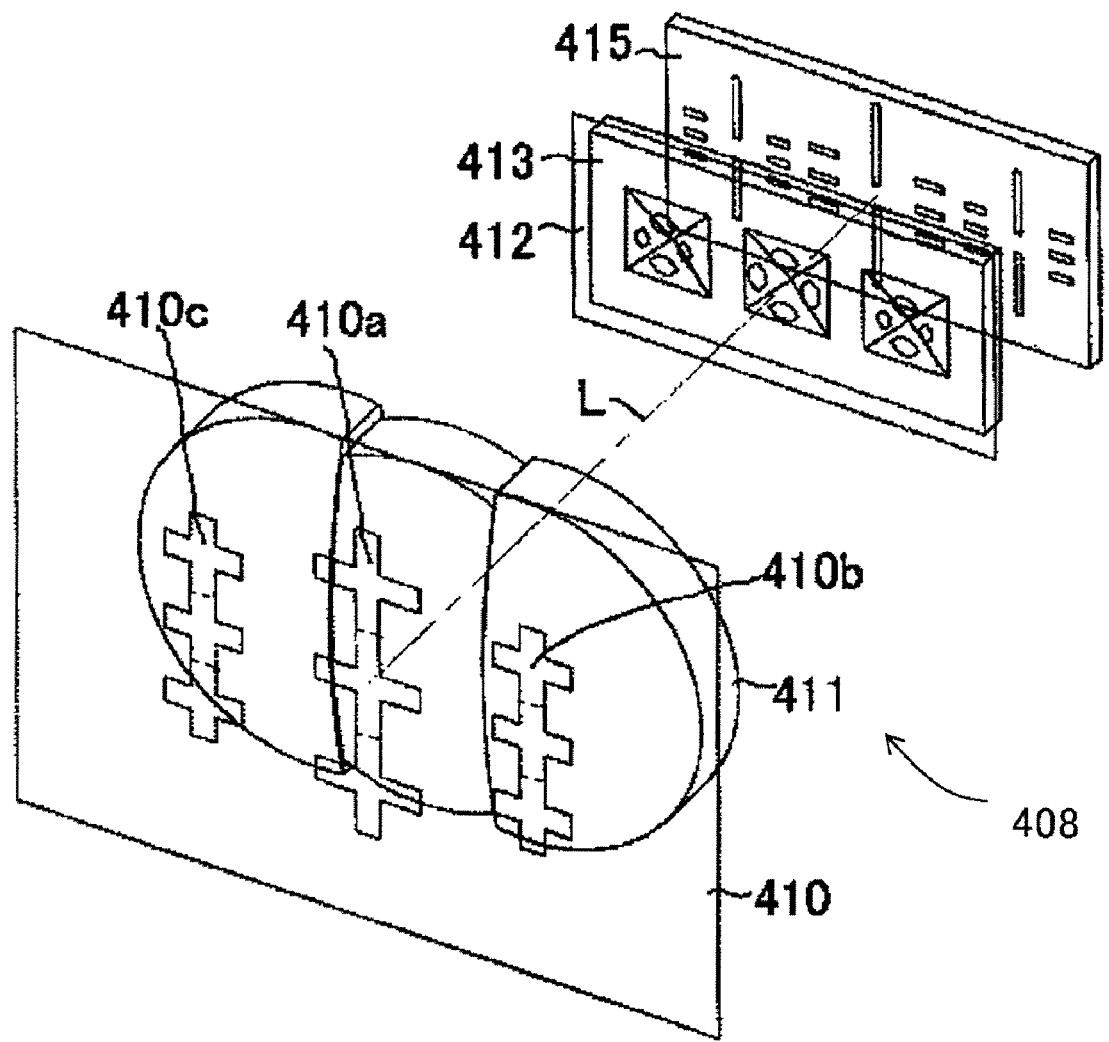
FIG. 16A is a perspective view showing a focus detection apparatus which is Embodiment 3 of the present invention.
Figure 16B:
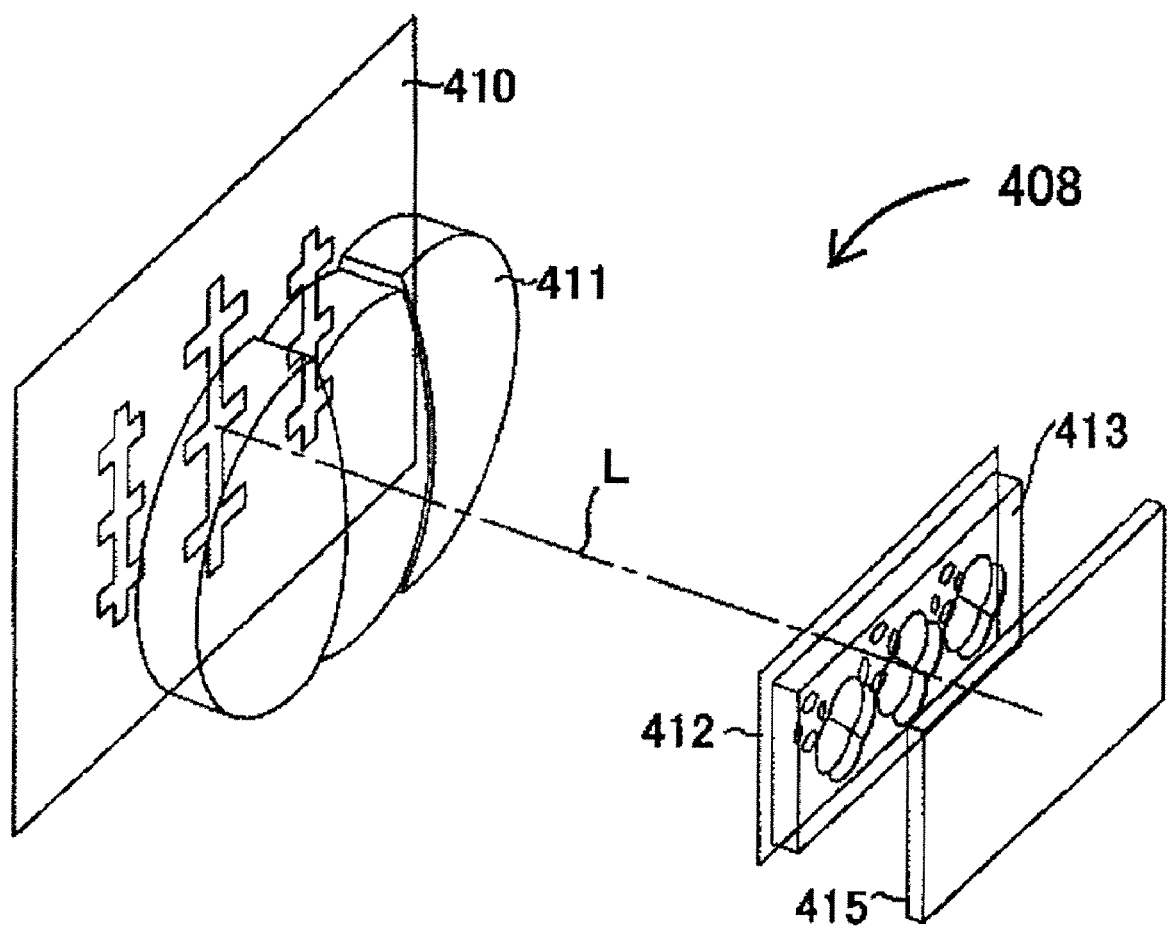
FIG. 16B is a perspective view showing the focus detection apparatus of Embodiment 3.

FIGS. 16A and 16B show the structure of a focus detection apparatus which is Embodiment 3 of the present invention. Embodiment 3 is a modification of Embodiment 1 and includes an increased number of cross focus detection areas in an image-pickup range as compared with Embodiment 1.

In FIGS. 16A and 16B, a focus detection apparatus 408 includes a field mask 410, a field lens 411, a stop 412, a secondary image-forming lens unit 413, and a light-receiving sensor 415.

The field mask 410 has three mask apertures 410a, 410b, and 410c formed therein. Each of the mask apertures has the shape formed by vertically connecting three cross apertures defined by dotted lines in FIG. 16A. The three mask apertures 410a, 410b, and 410c are used to provide a total of nine cross focus detection areas within the image-pickup range. In the following description, the three focus detection areas arranged in the vertical direction are referred to as a set of focus detection areas.

The field lens 411, the stop 412, the secondary image-forming lens unit 413, and the light-receiving sensor 415 have a lens portion, two pairs of stop apertures, two pairs of prism portions and two pairs of lens portions, and two pairs of light-receiving element arrays, respectively, for each set of focus detection areas. For example, the three cross focus detection areas formed by the mask aperture 410a are associated with one lens portion of the field lens 411, two pairs of stop apertures, two pairs of prism portions and two pairs of lens portions, and two pairs of light-receiving element arrays.

One mask aperture is associated with two light-receiving element arrays paired in the vertical direction on the light-receiving sensor 415 and each of the paired light-receiving element arrays is divided into three in the vertical direction in operation. One mask portion is associated with three sets (three pairs) of light-receiving element arrays paired in the horizontal direction. This provides three cross focus detection areas for one mask aperture.

The basic ideas for the field mask 410, the field lens 411, the stop 412, the secondary image-forming lens unit 413, and the light-receiving sensor 415 are identical to those in Embodiment 1. The prism portions and the lens portions of the secondary image-forming lens unit 413 form secondary optical images larger than those in Embodiment 1, but the structure of the secondary image-forming lens unit 413 is similar to that in Embodiment 1. Thus, Embodiment 3 can achieve the similar effects to those in Embodiment 1 in terms of an environmental change and the contrast component of an object.

Embodiment 4

This embodiment uses a sensor 215A which is larger than the above-described sensor 215. The sensor 215A is larger than a field lens 211A corresponding to the field lens 211. The field lens 211A refracts entering light so as to cause the entering light to form an image on the sensor 215A having a larger area.

Figure 17:
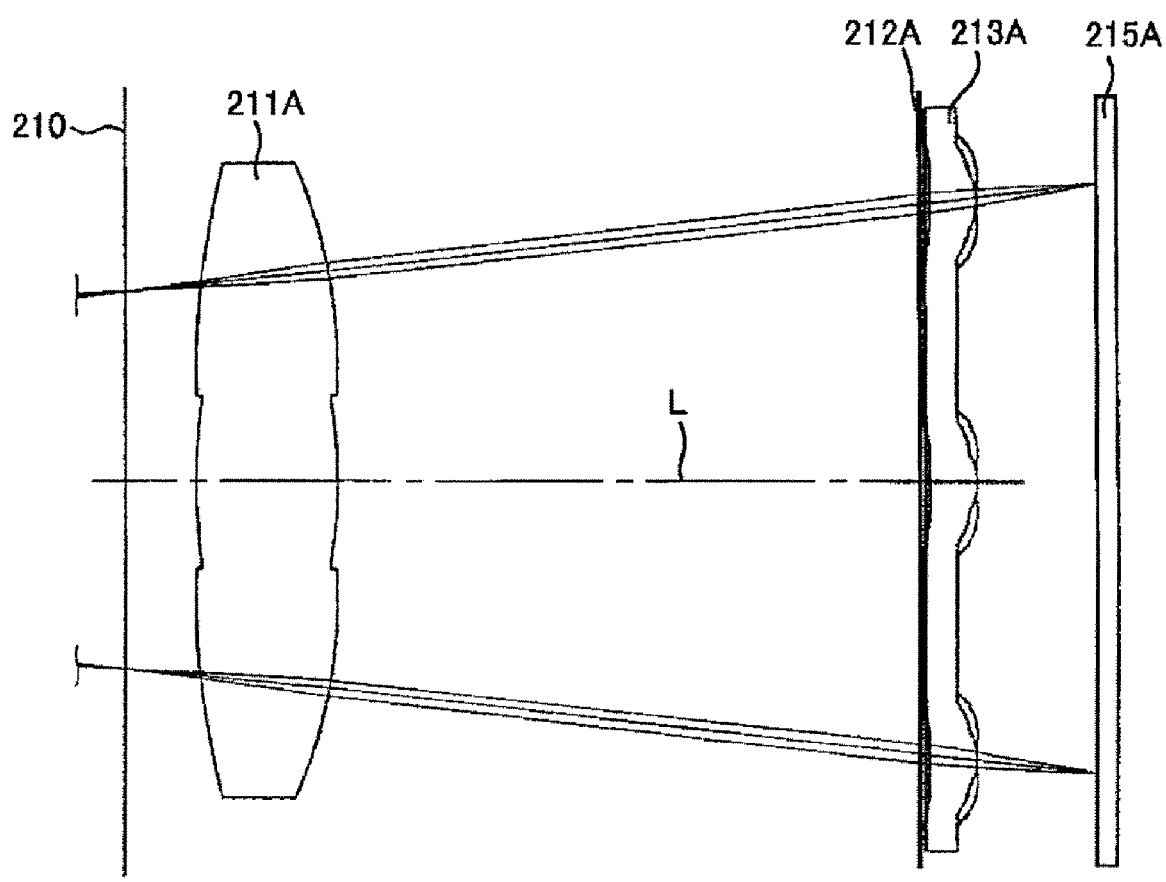
FIG. 17 is an optical section view showing the focus detection apparatus of Embodiment 4 viewed from above.

FIG. 17 is a cross section corresponding to FIG. 7 in Embodiment 1. A peripheral-side luminous flux passing through the field lens 211A is refracted thereby in a direction slightly away from the optical axis L. In this case, the above-described points B, C, D and E are shifted farther from the optical axis L than the above-described point A in the direction of the extended line 230. The points D and E are shifted farther from the optical axis L than the points B and C.

Furthermore, the point B is shifted farther from the optical axis L than the point C, and the point D is shifted farther from the optical axis L than the point E. This configuration enables to achieve the above-described aberration correction and luminous flux split.

The large sensor 215A may be divided into a central part and a peripheral part.

As described above, according to Embodiments 1 to 4, the structure and arrangement of the focus detection optical system for performing focus detection in the off-axis area within the image-pickup range can be appropriately set to achieve accurate focus detection without being affected by an environmental change or the contrast component of an object.

Furthermore, the present invention is not limited to these preferred embodiments and various variations and modifications may be made without departing from the scope of the present invention.

This application claims foreign priority benefits based on Japanese Patent Application No. 2006-128082, filed on May 2, 2006, which is hereby incorporated by reference herein in its entirety as if fully set forth herein.

What is claimed is:

1. A focus detection apparatus for detecting a phase difference between a pair of images comprising:
   a first image-forming lens unit which includes a first pair of lens portions forming a first pair of images on a first pair of light-receiving element arrays with luminous fluxes from an image-pickup optical system after the luminous fluxes pass through a first pair of apertures making a pair in a first direction; and
   a second image-forming lens unit which includes a second pair of lens portions forming a second pair of images on a second pair of light-receiving element arrays with luminous fluxes from the image-pickup optical system after the luminous fluxes pass through a second pair of apertures making a pair in a second direction, wherein a midpoint between the second pair of lens portions is located between the first pair of lens portions and displaced from a midpoint between the first pair of lens portions.

2. The focus detection apparatus according to claim 1, wherein the midpoint between the second pair of lens portions is located between the first pair of lens portions and displaced from the midpoint between the first pair of lens portions in the first direction.

3. The focus detection apparatus according to claim 1, wherein amounts of light entering the first and second pairs of lens portions are adjusted with a mask including first and second pairs of mask apertures respectively corresponding to the first and second pairs of lens portions, and a midpoint between the first pair of mask apertures coincides with a midpoint between the second pair of mask apertures.

4. The focus detection apparatus according to claim 1, wherein the midpoint of the second pair of lens portions is located farther from an optical axis of the image-pickup optical system than the midpoint of the first pair of lens portions.

5. The focus detection apparatus according to claim 1, wherein optical axes of the first pair of lens portions are located closer to an optical axis of the focus detection apparatus, which corresponds to an optical axis of the image-pickup optical system, in the second direction than the centers of the first pair of apertures, and the centers of the first pair of light-receiving element arrays are located closer to the optical axis of the focus detection apparatus in the second direction than the centers of the first pair of apertures.

6. The focus detection apparatus according to claim 1, wherein the centers of the first pair of light-receiving elements are located closer to an optical axis of the focus detection apparatus, which corresponds to an optical axis of the image-pickup optical system, in the second direction than optical axes of the first pair of lens portions.

7. The focus detection apparatus according to claim 1, wherein the second pair of lens portions has an asymmetric shape in the second direction.

8. The focus detection apparatus according to claim 1, wherein the first pair of lens portions and the second pair of lens portions respectively have a same shape.

9. An optical apparatus comprising the focus detection apparatus according to claim 1.

10. An image-pickup system comprising:
- an image-pickup apparatus which includes the focus detection apparatus according to claim 1; and
- an image-pickup lens which is mounted on the image-pickup apparatus and includes an image-pickup optical system.

* * * * *